US008871855B2

(12) United States Patent
Machida et al.

(10) Patent No.: US 8,871,855 B2
(45) Date of Patent: Oct. 28, 2014

(54) TERMINALLY UNSATURATED POLYOLEFIN AND METHOD FOR PRODUCING THE SAME

(75) Inventors: Shuji Machida, Ichihara (JP); Tomio Tatsumi, Ichihara (JP); Takenori Fujimura, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 13/700,008

(22) PCT Filed: May 17, 2011

(86) PCT No.: PCT/JP2011/002728
§ 371 (c)(1),
(2), (4) Date: Nov. 26, 2012

(87) PCT Pub. No.: WO2011/148586
PCT Pub. Date: Dec. 1, 2011

(65) Prior Publication Data
US 2013/0066007 A1 Mar. 14, 2013

(30) Foreign Application Priority Data
May 26, 2010 (JP) ................. 2010-120768

(51) Int. Cl.
| | |
|---|---|
| *C08F 290/14* | (2006.01) |
| *C08G 63/91* | (2006.01) |
| *C08G 63/48* | (2006.01) |
| *C08L 33/02* | (2006.01) |
| *C08F 20/08* | (2006.01) |
| *C08F 22/40* | (2006.01) |
| *C09J 123/14* | (2006.01) |
| *C09K 3/10* | (2006.01) |
| *C08L 23/22* | (2006.01) |
| *C08F 290/04* | (2006.01) |
| *C09J 123/22* | (2006.01) |
| *C09J 123/12* | (2006.01) |
| *C08L 23/12* | (2006.01) |
| *C08F 10/06* | (2006.01) |
| *C08F 110/06* | (2006.01) |
| *C08L 23/14* | (2006.01) |
| *C08F 210/06* | (2006.01) |

(52) U.S. Cl.
CPC ............. *C08F 10/06* (2013.01); *C09J 123/142* (2013.01); *C09K 3/10* (2013.01); *C08F 110/06* (2013.01); *C08L 23/22* (2013.01); *C09K 2200/0642* (2013.01); *C08L 23/142* (2013.01); *C08F 290/042* (2013.01); *C09J 123/22* (2013.01); *C08F 210/06* (2013.01); *C09J 123/12* (2013.01); *C08L 23/12* (2013.01); *C09K 2200/0617* (2013.01); *C08F 2810/40* (2013.01)
USPC ....... 524/504; 525/55; 525/333.7; 525/329.7; 525/326.5; 525/333.3; 525/327.4; 525/326.8; 525/72; 525/74; 525/73; 525/78; 525/70

(58) Field of Classification Search
USPC ........... 524/504; 525/55, 333.7, 329.7, 326.5, 525/333.3, 327.4, 326.8, 72, 73, 74, 78, 70
See application file for complete search history.

(56) References Cited

U.S. PATENT DOCUMENTS

| | | | |
|---|---|---|---|
| 5,321,189 A | 6/1994 | Mueller et al. | |
| 5,608,009 A * | 3/1997 | Machida et al. | ............... 525/247 |
| 5,658,999 A | 8/1997 | Inoue et al. | |
| 6,100,244 A * | 8/2000 | McMichael | ................ 514/44 R |
| 8,461,271 B2 * | 6/2013 | Machida et al. | ............... 525/285 |
| 2003/0096904 A1 | 5/2003 | Hakuta et al. | |
| 2003/0236378 A1 | 12/2003 | Ozdemir et al. | |
| 2004/0022757 A1 | 2/2004 | Sawaguchi | |
| 2006/0211595 A1 | 9/2006 | Sawaguchi | |
| 2007/0015893 A1 | 1/2007 | Hakuta et al. | |
| 2007/0117738 A1 | 5/2007 | Sawaguchi | |
| 2010/0076146 A1 | 3/2010 | Machida et al. | |
| 2010/0324242 A1 | 12/2010 | Machida et al. | |

FOREIGN PATENT DOCUMENTS

| | | |
|---|---|---|
| JP | 4-226506 | 8/1992 |
| JP | 6-41235 | 2/1994 |
| JP | 6-65110 | 3/1994 |
| JP | 2002-38129 | 2/2002 |
| JP | 2003-40921 | 2/2003 |
| JP | 2003-137927 | 5/2003 |
| JP | 2003-535193 | 11/2003 |
| JP | 2006-77163 | 3/2006 |
| JP | 2008-133320 | 6/2008 |
| JP | 2009-209174 | 9/2009 |
| WO | WO 2008/047860 A1 | 4/2008 |
| WO | WO 2008/066168 A1 | 6/2008 |
| WO | WO 2009/113630 A1 * | 9/2009 |

OTHER PUBLICATIONS

International Preliminary Report on Patentability and Written Opinion issued Dec. 20, 2012 in PCT/JP2011/002728.
International Search Report issued Jul. 19, 2011 in PCT/JP2011/002728.
Takashi Sawaguchi, et al., "Macromolecules", Preparation of $\alpha,\omega$-Diisopropenyloligopropylene by Thermal Degradation of Isotactic Polypropylene, vol. 28, No. 24, Nov. 20, 1995, 7 pages.
Extended Search Report issued Dec. 20, 2013 in European Application No. 11786290.4.

* cited by examiner

*Primary Examiner* — William Cheung
(74) *Attorney, Agent, or Firm* — Oblon, Spivak, McClelland, Maier & Neustadt, L.L.P.

(57) ABSTRACT

A terminally unsaturated polyolefin satisfying the following (1) to (4):
(1) the mesopentad fraction [mmmm] of propylene chain unit or butene-1 chain unit is 20 to 80 mol %;
(2) the number of terminal vinylidene groups per molecule is 1.3 to 2.5;
(3) the weight-average molecular weight Mw is 500 to 100,000; and
(4) the molecular weight distribution Mw/Mn is 1.1 to 2.6.

26 Claims, No Drawings

TERMINALLY UNSATURATED POLYOLEFIN AND METHOD FOR PRODUCING THE SAME

This application is a 371 of PCT National Stage of International Application No. PCT/JP2011/002728 filed on May 17, 2011, which claims benefit to JP 2010-120768 filed on May 26, 2010. The disclosures of which are incorporated herein by reference in their entirety.

TECHNICAL FIELD

The invention relates to a terminally unsaturated polyolefin and a method for producing the same. In particular, the invention relates to a terminally unsaturated polyolefin having a large number of unsaturated groups at both ends and a narrow molecular weight distribution, and to a method for producing a terminally unsaturated polyolefin which is efficient and is capable of suppressing the generation of bi-products.

BACKGROUND ART

A high-molecular weight polyolefin has been widely used as an industrial material since it has a high chemical stability, is excellent in mechanical properties and is inexpensive. On the other hand, the use of a low-molecular polyolefin is limited to waxes. However, a low-molecular polyolefin is expected to attain a higher level of functionality.

An attempt to improve the functionality of a polyolefin has been conducted for many years. However, in addition to the fact that no effective manufacturing technologies have been established for a low- to middle-molecular weight region, a technology of adding polarity or the like to a polyolefin as a hydrocarbon has been restricted. In particular, an attempt to product a low- to middle-molecular weight polyolefin by a metallocene catalyst has been made in recent years. However, this attempt has its limit for introducing a functional group such as an unsaturated group which is necessary to impart a higher degree of functionality.

In order to introduce an unsaturated group, heat decomposition of a high-molecular weight polyolefin, in particular, polypropylene, is disclosed (Patent Documents 1 and 2, and Non-Patent Document 1). Patent Document 1 discloses propylene (the number of vinylidene groups per molecule is 1.8, for example) obtained by decomposing isotactic polypropylene at 370° C. Patent Document 2 discloses a heat-decomposable polybutene (the number of vinylidene groups per molecule is 1.53 to 1.75, for example) obtained by heat decomposing polybutene at 370° C.

In Patent Document 1 and Patent Document 2, the number of vinylidene groups is increased by highly decomposing a high-molecular weight substance. However, this method has a problem that the yield is lowered due to the generation of a large amount of bi-products.

Non-Patent Document 1 discloses a heat decomposed polypropylene (the number of vinylidene groups per molecule is 1.66 to 1.80). It discloses that, in respect of the relationship between the molecular weight and the number of vinylidene groups, it is difficult to allow the number of vinylidene groups per molecule to be 1.8 or more, particularly 2.0 or more. Further, by the method disclosed in Non-Patent Document 1, polypropylene is obtained only in the form of a mixture of both terminally saturated polypropylene, one terminally saturated polypropylene and both terminally unsaturated polypropylene, resulting in a poor yield.

As mentioned above, it is difficult to control an unsaturated group generated at the decomposition terminal to attain a high degree of unsaturation, and hence, it was impossible to produce an intended product efficiently. In addition, the resulting polyolefin has a high tacticity [mmmm] or does not have tacticity.

In addition to the method by heat decomposition, a method for controlling a terminal unsaturated group by using a catalyst (a metallocene catalyst, for example) is disclosed (Patent Document Nos. 3 to 6).

In Patent Document 3, atactic polypropylene having terminal vinylidene groups is produced by polymerization by using a zirconocene dichloride catalyst. Patent Document 4 discloses an example of producing isotactic polypropylene having terminal vinylidene groups by using polypropylene having tacticity [mmmm] of 88.8 and 94%. Patent Document 5 discloses highly-pure and highly-selective polyolefin having a terminal vinylidene group which is obtained by using low tactic polyolefin having tacticity [mmmm] of 30 to 80%.

However, by this method, it is impossible to attain a high degree of unsaturation since the number of terminal unsaturated groups is at most 1.0 per molecule.

Patent Document 6 discloses a method of introducing an unsaturated group by polymerization. Specifically, a method of introducing a large amount of diolefin residues per molecule by an ethylene/propylene/diolefin copolymerization is disclosed.

However, in the case of copolymerization with diolefin, it is difficult to introduce an unsaturated group at the terminal, and hence, there is a problem that a side reaction such as cross linking or the like proceeds during the polymerization reaction.

Of the above-mentioned terminally-unsaturated polyolefin, polyolefin showing tacticity is mainly highly crystalline isotactic polypropylene. However, in order to allow it to be used in various applications, control of plasticity, hardness and conditions such as liquidity and solidity is required. Under such circumstances, a polyolefin base material of which the molecular weight is in the low to middle range, and has a large number of terminal unsaturated groups and controlled tacticity has been required.

RELATED ART DOCUMENTS

Patent Documents

Patent Document 1: JP-A-2003-40921
Patent Document 2: JP-A-2003-137927
Patent Document 3: JP-A-H6-65110
Patent Document 4: JP-A-H04-226506
Patent Document 5: WO2008/047860
Patent Document 6: JP-A-2002-38129

Non-Patent Documents

Non-Patent Document 1: Macromolecules, 28, 7973 (1995)

SUMMARY OF THE INVENTION

An object of the invention is to provide a low to middle tactic terminally unsaturated polyolefin having a high degree of unsaturation.

Another object of the invention is to provide a terminally unsaturated polyolefin which generates a small amount of a side product.

According to the invention, the following terminally-unsaturated polyolefin or the like are provided.

1. A terminally unsaturated polyolefin comprising:
   a propylene homopolymer;
   a propylene-based copolymer comprising propylene, ethylene and one or more α-olefins each having 4 to 10 carbon atoms and containing ethylene and the α-olefins each having 4 to 10 carbon atoms in an amount of 10 mol % or less; a butene-1 homopolymer; or
   a butene-1-based copolymer comprising butene-1, ethylene, propylene and one or more α-olefins each having 5 to 10 carbon atoms and containing ethylene, propylene and the α-olefins each having 5 to 10 carbon atoms in an amount of 10 mol % or less:
   the terminally unsaturated polyolefin satisfying the following (1) to (4);
   (1) the mesopentad fraction [mmmm] of propylene chain unit or butene-1 chain unit is 20 to 80 mol %;
   (2) the number of terminal vinylidene groups per molecule is 1.3 to 2.5;
   (3) the weight-average molecular weight Mw is 500 to 100,000; and
   (4) the molecular weight distribution Mw/Mn is 1.1 to 2.6.

2. The terminally unsaturated polyolefin according to 1 which comprises the propylene homopolymer.

3. A method for producing the terminally unsaturated polyolefin according to 1 or 2 comprising decomposing a raw material polyolefin in the presence of an inert gas,
   the raw material polyolefin being selected from
   a propylene homopolymer;
   a propylene-based copolymer comprising ethylene and one or more α-olefins each having 4 to 10 carbon atoms and containing ethylene and the α-olefins each having 4 to 10 carbon atoms in an amount of 10 mol % or less;
   a butene-1 homopolymer; and
   a butene-1-based copolymer comprising butene-1, ethylene, propylene and one or more α-olefins each having 5 to 10 carbon atoms and containing ethylene, propylene and the α-olefins each having 5 to 10 carbon atoms in an amount of 10 mol % or less:
   the raw material polyolefin satisfying the following (5) and (6);
   (5) the tacticity [mmmm] of propylene chain unit or butene-1 chain unit is 20 to 80 mol %; and
   (6) the weight average molecular weight Mw is 4000 to 1,000,000.

4. The method for producing a terminally unsaturated polyolefin according to 3, wherein the decomposition is a heat decomposition reaction in which the raw material polyolefin is subjected to a heat treatment at a temperature of 300 to 400° C. for 30 minutes to 10 hours.

5. The method for producing a terminally unsaturated polyolefin according to 3, wherein the decomposition is a radical decomposition reaction in which an organic peroxide is added in an amount of 0.05 to 2 mass % relative to the raw material polyolefin at 160 to 300° C.

6. The method for producing a terminally unsaturated polyolefin according to 5, wherein the one minute half life temperature of the organic peroxide is 140 to 270° C.

7. A terminally unsaturated polyolefin obtained by decomposing a raw material polyolefin selected from
   a propylene homopolymer;
   a propylene-based copolymer comprising propylene, ethylene and one or more α-olefins each having 4 to 10 carbon atoms and containing ethylene and the α-olefins each having 4 to 10 carbon atoms in an amount of 10 mol % or less; a butene-1 homopolymer; and
   a butene-1-based copolymer comprising butene-1, ethylene, propylene and one or more α-olefins each having 5 to 10 carbon atoms and containing ethylene, propylene and the α-olefins each having 5 to 10 carbon atoms in an amount of 10 mol % or less:
   the terminally unsaturated polyolefin satisfying the following (7) to (10);
   (7) the number of terminal vinylidene groups per molecule (fv) is 1.3 to 2.5;
   (8) $fv \geq -2 (Mp/Mm)+2$ wherein Mp is the number average molecular weight of the terminally unsaturated polyolefin, Mm is the number average molecular weight of the raw material polyolefin, and Mp/Mm is 0.05 to 0.8;
   (9) the weight average molecular weight Mw is 500 to 100,000; and
   (10) the molecular weight distribution Mw/Mn is 1.1 to 2.6.

8. The terminally unsaturated polyolefin according to 7 which is a terminally unsaturated polyolefin obtained by decomposing a propylene homopolymer or a propylene-based copolymer, wherein the propylene chain unit of the propylene homopolymer or the propylene-based copolymer comprises an atactic structure, a syndiotactic structure or an isotactic structure.

9. The terminally unsaturated polyolefin according to 7 or 8 wherein the raw material polyolefin is a propylene homopolymer.

10. A method for producing the terminally unsaturated polyolefin according to any of 7 to 9, the method comprising decomposing a raw material polyolefin in the presence of an inert gas;
    the raw material polyolefin being selected from
    a propylene homopolymer;
    a propylene-based copolymer comprising propylene, ethylene and one or more α-olefins each having 4 to 10 carbon atoms and containing ethylene and the α-olefins each having 4 to 10 carbon atoms in an amount of 10 mol % or less;
    a butene-1 homopolymer; and
    a butene-1-based copolymer comprising butene-1, ethylene, propylene and one or more α-olefins each having 5 to 10 carbon atoms and containing ethylene, propylene and the α-olefins each having 5 to 10 carbon atoms in an amount of 10 mol % or less:
    the raw material polyolefin having a weight average molecular weight of 4000 to 1,000,000.

11. A functional polyolefin wherein 5 mol % or more of the terminal vinylidene groups of the terminally unsaturated polyolefin according to any of 1, 2, 7, 8 and 9 have a functional group.

12. The functional polyolefin according to 11 wherein the functional group is one or more selected from a hydroxyl group, an epoxy group, an isocyanate group, an alkoxysilicon group, an alkylsilicon group, a carboxyl group, an amino group and an acid anhydride structure.

13. A cross-linked body obtained by subjecting the functional polyolefin according to 11 or 12 comprising at least alkoxysilicon group as the functional group to wet curing.

14. A reaction product obtained by reacting the terminally unsaturated polyolefin according to any of 1, 2, 7, 8 and 9 with organohydrogen polysiloxane having two or more SiH groups in a molecule.

15. A method for producing a graft copolymer or a thermoplastic resin composition comprising the graft copolymer; the method comprising graft polymerizing, in the presence of 0.001 to 10 parts by mass of a radical polymerization initiator at 40 to 230° C.,
    100 parts by mass of a combination of 20 to 100 mass % of the terminally unsaturated polyolefin according to any of 1, 2, 7, 8 and 9 and 0 to 80 mass % of another polyolefin than the terminally unsaturated polyolefin, and 0.2 to 300 parts by mass of one or more monomers selected from the following [I] to [IV], or 0.2 to 300 parts by mass of a mixture of one or more monomers selected from the following Group A and one or more monomers selected from the following Group B:

[I] acrylic acid and its derivatives;
[II] methacrylic acid and its derivatives;
[III] vinylesters and its derivatives or vinylalkoxysilane; and
[IV] styrene and its derivatives;

Group A:
[V] maleic anhydride and substituted maleic anhydride;
[VI] maleic acid and its esters;
[VII] maleimide and substituted maleimide;

Group B:
[I] acrylic acid and its derivatives;
[II] methacrylic acid and its derivatives;
[III] vinylester and its derivatives, or vinylalkoxysilane;
[IV] styrene and its derivatives; and
[VIII] α-olefin 16. The method for producing a graft copolymer or a thermoplastic resin composition comprising the graft copolymer according to 15 wherein the graft polymerization is conducted in the presence of a chain transfer agent.

17. A method for producing a graft copolymer or a thermoplastic resin comprising the graft copolymer, the method comprising causing a mixture in which the terminally unsaturated polyolefin according to any of 1, 2, 7, 8 and 9 and a monomer (a) which is substantially not radically homopolymerizable are co-present to be in contact with a monomer (b) which is copolymerizable with the monomer (a).

18. A graft copolymer comprising a polyolefin selected from
a propylene homopolymer;
a propylene-based copolymer comprising propylene, ethylene and one or more α-olefins each having 4 to 10 carbon atoms and containing ethylene and the α-olefins each having 4 to 10 carbon atoms in an amount of 10 mol % or less;
a butene-1 homopolymer; and
a butene-1-based copolymer comprising butene-1, ethylene, propylene and one or more α-olefins each having 5 to 10 carbon atoms and containing ethylene, propylene and the α-olefins each having 5 to 10 carbon atoms in an amount of 10 mol % or less;
the polyolefin having, at both ends thereof, a polyolefin chain unit derived from one or more selected from the following [I], [II], [III] and [IV], or a polyolefin chain unit derived from one or more selected from the following Group A and one or more selected from the following Group B:
the graft copolymer satisfying the following (c);
[I] acrylic acid and its derivatives;
[II] methacrylic acid and its derivatives;
[III] vinylesters and its derivatives or vinylalkoxysilane; and
[IV] styrene and its derivatives;

Group A:
[V] maleic anhydride and substituted maleic anhydride;
[VI] maleic acid and its esters;
[VII] maleimide and substituted maleimide;

Group B:
[I] acrylic acid and its derivatives;
[II] methacrylic acid and its derivatives;
[III] vinylester and its derivatives or vinylalkoxysilane;
[IV] styrene and its derivatives;
[VIII] α-olefin; and
(c) the molecular weight distribution (Mw/Mn) is 1.6 to 6.

19. The graft copolymer according to 18 wherein the mesopentad fraction [mmmm] of the propylene chain unit or the butene-1 chain unit of the polyolefin chain unit is 20 to 80 mol %.

20. The graft copolymer according to 18 wherein the polyolefin is a polypropylene homopolymer comprising an atactic structure or a syndiotactic structure.

21. A thermoplastic resin composition comprising the graft copolymer according to 18 and polyolefin.

22. A composition wherein the graft copolymer according to 18 or the thermoplastic resin composition according to 21, further comprises a thermoplastic resin.

23. A composition wherein the graft copolymer according to 18 or the thermoplastic resin composition according to 21, further comprises a filler and/or a pigment.

24. Use of the graft copolymer according to 18 or the thermoplastic resin composition according to 21 as an adhesive, a resin compatibilizer, a dispersant or a coating material.

25. Use of the functional polyolefin according to 11 or 12 as an adhesive, a compatibilizer, a dispersant or a coating agent.

26. Use of the functional polyolefin according to 11 or 12 as a reactive hot melt adhesive, a sealing agent or a potting agent.

According to the invention, a low to middle tactic terminally unsaturated polyolefin having a high degree of unsaturation can be provided.

According to the invention, a method of producing a terminally unsaturated polyolefin generating only a small amount of bi-products can be provided.

MODE FOR CARRYING OUT THE INVENTION

[First Terminally Unsaturated Polyolefin]
The first terminally unsaturated polyolefin of the invention comprises:
a propylene homopolymer;
a propylene-based copolymer comprising propylene, ethylene and one or more α-olefins each having 4 to 10 carbon atoms and containing ethylene and the α-olefins each having 4 to 10 carbon atoms in an amount of 10 mol % or less;
a butene-1 homopolymer; or
a butene-1-based copolymer comprising butene-1, ethylene, propylene and one or more α-olefins each having 5 to 10 carbon atoms and containing ethylene, propylene and the α-olefins each having 5 to 10 carbon atoms in an amount of 10 mol % or less;
the terminally unsaturated polyolefin satisfying the following (1) to (4):
(1) the mesopentad fraction [mmmm] of propylene chain unit or butene-1 chain unit is 20 to 80 mol %;
(2) the number of terminal vinylidene groups per molecule is 1.3 to 2.5;
(3) the weight-average molecular weight Mw is 500 to 100,000; and
(4) the molecular weight distribution is 1.1 to 2.6.

The first terminally unsaturated polyolefin of the invention is a low to middle tactic terminally unsaturated polyolefin, which has not only flexibility, dissolubility in a solvent, low temperature fluidity and low crystallinity, but also heat resistance and solvent resistance, which are contradict properties, due to the reaction of the terminal unsaturated group.

The first terminally unsaturated polyolefin of the invention is polyolefin comprising any of the following (i) to (iv), preferably comprising:
(i) Propylene homopolymer (i) propylene homopolymer;
(ii) Propylene-based copolymer comprising propylene, ethylene and one or more α-olefins each having 4 to 10 carbon atoms and containing ethylene and α-olefins each having 4 to 10 carbon atoms in an amount of 10 mol % or less;

(iii) Butene-1 homopolymer;

(iv) Butene-1-based copolymer comprising butene-1, ethylene, propylene and one or more α-olefins each having 5 to 10 carbon atoms and containing ethylene, propylene and α-olefins each having 5 to 10 carbon atoms in an amount of 10 mol % or less.

Examples of the α-olefin of the copolymers (ii) and (iii) mentioned above include butene-1, pentene-1, heptene-1, hexene-1, heptene-1, octene-1, decene-1,4-methylepentene-1 and 3-methylbutene-1.

The content of ethylene and α-olefin in the copolymers (i) and (iv) mentioned above or the content of ethylene, propylene and α-olefin is preferably exceeding 0 mol % and 5 mol % or less. If the content of ethylene and α-olefin or the content of ethylene, propylene and α-olefin exceeds 10 mol %, affinity of α-olefin to polypropylene and polybutene may be lowered, resulting in lowering of adhesion strength or the like of polyolefin.

The first terminally unsaturated polypropylene of the invention has a mesopentad fraction [mmmm] of the propylene chain unit or the butene-1 chain unit of 20 to 80 mol %, preferably 25 to 70 mol %, with 30 to 60 mol % being more preferable.

If the mesopentad fraction of the propylene chain unit or the butene-1 chain unit is less than 20 mol %, polyolefin does not exhibit crystallinity. Accordingly, when used as an adhesive, sufficient adhesion strength may not be shown to crystalline polypropylene. On the other hand, when the mesopentad fraction exceeds 80 mol %, crystallinity may be increased, and, as a result, melting properties at low temperatures may become deteriorated, resulting in lowering of workability such as applicability.

Meanwhile, the above-mentioned mesopentad fraction [mmmm] is the probability of mesofractions in the pentad unit in a polypropylene molecule or a polybutene chain which is measured by the methyl group signals of $^{13}$C-NMR spectrum according to the method proposed by A. Zambelli et al. in "Macromolecules, 6, 925 (1973)". A larger mesopentad fraction [mmmm] leads to a higher tacticity.

Measurement of $^{13}$C-NMR spectrum can be conducted by means of the following apparatus under the following conditions according to the peak assignment proposed by A. Zambelli et al. in the "Macromolecules, 8, 687 (1975).

Apparatus: JNM-EX400 $^{13}$C-NMR apparatus manufactured by JEOL Ltd.
Method: Proton complete decoupling method
Concentration: 220 mg/mL
Solvent: A 90:10 (volume ratio) mixed solvent of 1,2,4-trichlorobenzene and heavy benzene
Temperature: 130° C.
Pulse width: 45°
Pulse repetition interval: 4 seconds
Multiplication: 10000 times In the terminally unsaturated polyolefin of the invention, the number of terminal vinylidene groups per molecule is 1.3 to 2.5, preferably, 1.35 to 2.5, with 1.40 to 2.0 being particularly preferable.

If the number of terminal vinylidene groups per molecule is less than 1.3, heat resistance may not be sufficiently imparted by a reaction which starts from the terminal vinylidene group. On the other hand, if the number of terminal vinylidene groups per molecule exceeds 2.5, polyolefin contains a large amount of a branched structure. Since a branched structure has a molten fluidity properties different from those of a straight-chain structure, behaviors such as coating may be changed.

The number of the above-mentioned terminal vinylidene groups per molecule can be obtained by the $^1$H-NMR measurement. Based on the terminal vinylidene group appearing at δ4.8 to 4.6 (2H) obtained by the $^1$H-NMR measurement, the content of the terminal vinylidene group (C) (mol %) can be calculated. Further, from the number average molecular weight (Mn) and the monomer molecular weight (M) obtained from a gel permeation chromatograph (GPC), the number of the terminal vinylidene groups per molecule can be calculated by the following formula:

$$\text{Number of terminal vinylidene groups per molecule} = (Mn/M) \times (C/100)$$

In addition to the above-mentioned methods, it is possible to obtain the number of terminal vinylidene groups by utilizing $^{13}$C-NMR. By this method, the type of all terminal groups is specified, and the amount of the terminal groups is also specified.

From the amount ratio of the terminal vinylidene groups relative to the total amount of terminal groups, the number of terminal vinylidene groups per molecule (the number of terminal unsaturated groups when the terminal unsaturated group is a vinylidene group) can be determined. From the amount ratio of the terminal vinylidene group relative to the total amount of terminal vinylidene groups, selectivity of the terminal vinylidene group can be determined.

Measurement of the number of terminal vinylidene groups by utilizing $^1$H-NMR and $^{13}$C-NMR will be explained below taking a propylene polymer as an example.

[Measurement of the Number of Terminal Vinylidene Groups Utilizing $^1$H-NMR]

In a propylene polymer, <2> the methylene group of the terminal vinylidene group (4.8 to 4.6 ppm) and <1> the methylene group of the terminal vinyl group (5.10 to 4.90 ppm) are observed. The amount ratio to the total amount of propylene can be calculated by the following formula. Meanwhile, <3> corresponds to the peak intensity corresponding to methane having a propylene unit chain of 0.6 to 2.3 ppm, methylene and methyl.

$$\text{Amount }(A)\text{ of terminal vinylidene groups} = (<2>/2)/[(<3>+4\times<1>/2+3\times<2>/2)/6]\times100 \text{ unit: mol \%}$$

$$\text{Amount }(B)\text{ of terminal vinyl groups} = (<1>/2)/[(<3>+4\times<1>/2+3\times<2>/2)/6]\times100 \text{ unit: mol \%}$$

[Measurement of the Number of Terminal Vinylidene Groups Utilizing $^{13}$C-NMR]

In a propylene polymer, <5> the terminal methyl group of n-propyl terminal (around 14.5 ppm), <6> the terminal methyl group of n-butyl terminal (around 14.0 ppm), <4> the methine group of the iso-butyl terminal (around 25.9 ppm) and <7> the methylene group of the terminal vinylidene group (around 111.7 ppm) are observed.

The peak intensity of the amount of the terminal vinyl group by $^{13}$C-NMR can be calculated as follows by utilizing (A) and (B) obtained by $^1$H-NMR spectrum.

The peak intensity of the amount of the terminal vinyl group by $^{13}$C-NMR=(B)/(A)×<7>

Here, the total concentration (T) of the terminal group is expressed as follows.

$$T = (B)/(A) \times <7> + <4> + <5> + <6> + <7>$$

Therefore, the amount ratio of each terminal will be as follows.
(C) Terminal vinylidene group=<7>/T×100 unit: mol %
(D) Terminal vinyl group=(B)/(A)×<7>×100
(E) n-propyl terminal=<5>/T×100
(F) n-butyl terminal=<6>/T×100
(G) Iso-butyl terminal=<4>/T×100

The number of the terminal vinylidene groups per molecule is 2×(C)/100 unit: per molecule The first terminally unsaturated polyolefin of the invention has a weight average molecular weight Mw of 500 to 100,000, preferably 700 to 90,000, more preferably 800 to 80,000.

If the weight average molecular weight is less than 500, when imparting polyolefin with heat resistance by a reaction starting from the terminal vinylidene group, plasticity of polyolefin may be adversely affected. On the other hand, if the weight average molecular weight exceeds 100,000, melt viscosity may increase, resulting in lowering of workability such as applicability.

Meanwhile, the weight average molecular weight as mentioned above can be measured by the gel permeation chromatography (GPC) method.

The first terminally unsaturated polyolefin of the invention has a molecular weight distribution Mw/Mn of 1.1 to 2.6, preferably 1.1 to 2.55, more preferably 1.1 to 2.5.

It is technically difficult to allow the molecular weight distribution to be less than 1.1. On the other hand, if the molecular weight distribution exceeds 2.6, mechanical characteristics may be lowered in order to respond to an increase in the amount of low-molecular weight polyolefin.

The molecular weight distribution Mw/Mn can be obtained by measuring the weight average molecular weight (Mw) and the number average molecular weight (Mn) by GPC, respectively.

The weight average molecular weight (Mw) and the number average molecular weight (Mn) can be obtained according to the Universal Calibration method by using the constants K and a of the Mark-Houwink-Sakurada formula since the polystyrene-converted molecular weight is converted to the molecular weight of a corresponding polymer.

Specifically, it can be determined by the method described in the "Size Exclusion Chromatography", Sadao Mori, pages 67 to 69, 1992, Kyoritsu Shuppan Co., Ltd. Meanwhile, K and a are described in the "Polymer Handbook", John Wiley & Sons, Inc. In addition, it can be determined by a normal method based on the relationship between the absolute molecular weight, which is newly calculated, and the limiting viscosity.

The measuring apparatus and conditions of GPC are as follows, for example.
Detector: RI detector for liquid chromatography Waters 150 C
Column: TOSO GMHHR-H(S) HT
Solvent: 1,2,4-trichlorobenzene
Measuring temperature: 145° C.
Flow rate: 1.0 ml/min
Sample concentration: 0.3 mass %

[Method for Producing a First Terminally Unsaturated Polyolefin]

The first terminally unsaturated polyolefin of the invention can be produced by decomposing in the presence of an inert gas a raw material polyolefin which is selected from a propylene homopolymer; a propylene-based copolymer comprising propylene, ethylene and one or more α-olefins each having 4 to 10 carbon atoms and containing ethylene and the α-olefins each having 4 to 10 carbon atoms in an amount of 10 mol % or less; butene-1 homopolymer; and a butene-1-based copolymer comprising butene-1, ethylene, propylene and one or more α-olefins each having 5 to 10 carbon atoms and containing ethylene, propylene and the a olefins each having 5 to 10 carbon atoms in an amount of 10 mol % or less; and the raw material polyolefin satisfying the following (5) and (6);
(5) tacticity [mmmm] of propylene chain unit or butene-1 chain unit is 20 to 80 mol %
(6) the weight average molecular weight Mw is 4000 to 1,000,000

The method for producing a terminally unsaturated polyolefin as mentioned above can improve the purity of polyolefin since the amount of a liquid or gaseous side product can be decreased. Further, a terminally unsaturated polyolefin can be produced at a low cost.

Since the tacticity [mmmm] is 20 to 80 mol %, the raw material polyolefin can be molten easily at low temperatures, or since it shows good solubility in a solvent, the decomposition reaction site and the decomposition temperature can be selected widely, whereby it is possible to decompose at relatively low temperatures. As a result, it can suppress occurrence of side reactions. In addition, in the case of decomposition which uses an organic peroxide in combination, decomposition can be conducted efficiently by a more moderate and short-time reaction, whereby the above-mentioned advantages of the raw material polyolefin can be exhibited more sufficiently. In particular, when the raw material polyolefin already has a terminal unsaturated group, the above-mentioned advantages can be fully exhibited.

The above-mentioned propylene-based polymer (propylene homopolymer and propylene-based copolymer) which is the raw material polyolefin of the first terminally unsaturated polyolefin and the above-mentioned butene-based polymer (butene-1 homopolymer and butene-1-based polymer) are the same as those of the propylene-based polymer and the butene-based copolymer of the first unsaturated polyolefin.

The tacticity [mmmm] of the propylene chain unit or the butane-1 chain unit of the raw material polyolefin is also the same as that of the first terminally unsaturated polyolefin.

The weight average molecular weight Mw of the raw material polyolefin is 4000 to 1,000,000, preferably 5,000 to 900,000, with 600 to 800,000 being more preferable.

If the weight average molecular weight of the raw material polyolefin is less than 4000, the decomposition ratio may not be set high. On the other hand, if the weight average molecular weight of the raw material polyolefin exceeds 1,000,000, though the decomposition ratio can be set high, the viscosity during the decomposition is high, whereby restrictions may be imposed on the stirring power, stirring uniformity or the like during the process.

It is preferred that the raw material polyolefin have 0.4 to 1.0, more preferably 0.45 to 1.0, further preferably 0.5 to 1.0, most preferably 0.55 to 1.0 terminally unsaturated groups per molecule.

If the number of terminally unsaturated groups is less than 0.4 per molecule, the number of terminally unsaturated groups is not so increased by decomposition. Therefore, the polymer may be required to be decomposed in order to increase the number of terminally unsaturated groups. On the other hand, if the number of terminally unsaturated groups per molecule exceeds 1.0, production is difficult by a technology using a polymerization catalyst, which will be mentioned later.

As examples of the terminally unsaturated group, a vinyl group, a vinylidene group, a trans(vinylene) group, or the like can be given, with a vinylidene group being preferable. A vinylidene group has a wide applicable range for various reactions including radical polymerization, and hence can satisfy various requirements.

The raw material polyolefin can be produced by using a metallocene catalyst composed of combination of the following components (A), (B) and (C), and using hydrogen as a molecular weight controlling agent. Specifically, it can be produced by a method disclosed in WO2008/047860.

(A) A transition metal compound containing a metal element belonging to Groups 3 to 10 of the Periodic Table having a cylcopentadienyl group, a substituted cyclopentadienyl group, an indenyl group and a substituted indenyl group;

(B) A compound capable for forming an ionic complex by reacting with a transition metal compound; and (C) An organic aluminum compound As the transition metal compound containing a metal element belonging to Groups 3 to 10 of the Periodic Table having a cylcopentadienyl group, a substituted cyclopentadienyl group, an indenyl group and a substituted indenyl group, a double-bridged complex represented by the following general formula (I) can be given.

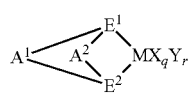

(I)

In the above-mentioned general formula (I), M indicates a metal element belonging to Groups 3 to 10 of the Periodic Table. Specific examples thereof include titanium, zirconium, hafnium, yttrium, vanadium, chromium, manganese, nickel, cobalt, palladium and lanthanoid-based metal. Of these, in respect of olefin polymerization activity or the like, titanium, zirconium and hafnium are preferable. In respect of the yield of terminal vinylidene groups and catalyst activity, zirconium is most preferable.

$E^1$ and $E^2$ are independently a ligand selected from a substituted cyclopentadienyl group, an indenyl group, a substituted indenyl group, a heterocyclopentadienyl group, a substituted hetereocyclopentadienyl group, an amide group (—N<), a phosphine group (—P<), a hydrocarbon group [>CR—, >C<] and a silicon-containing group [>SiR-, >Si<] (wherein R is hydrogen or a hydrocarbon group having 1 to 20 carbon atoms or a hetero atom-containing group), and form a cross-linking structure through $A^1$ and $A^2$. $E^1$ and $E^2$ may be the same or different from each other. As $E^1$ and $E^2$, a cyclopentadienyl group, a substituted cyclopentadienyl group, an indenyl group and a substituted indenyl group are preferable. At least one of $E^1$ and $E^2$ is a cyclopentadienyl group, a substituted cyclopentadienyl group, an indenyl group or a substituted indenyl group.

X is a σ-bondable ligand. If plural Xs are present, the Xs may be the same or different, and may be cross-linked with other X, $E^1$, $E^2$ or Y. Specific examples of X include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulfide group having 1 to 20 carbon atoms and an acyl group having 1 to 20 carbon atoms.

As the halogen atom, a chlorine atom, a fluorine atom, a bromine atom and an iodine atom can be given. As specific examples of the hydrocarbon group having 1 to 20 carbon atoms, an alkyl group such as a methyl group, an ethyl group, a proply group, a butyl group, a hexyl group, a cyclohexyl group and an octyl group; an alkenyl group such as a vinyl group, a propenyl group and a cyclohexenyl group; an arylalkyl group such as a benzyl group, a phenylethyl group and a phenylpropyl group; and an aryl group such as a phenyl group, a tolyl group, a dimethylphenyl group, a trimethylphenyl group, an ethylphenyl group, a propylphenyl group, a biphenyl group, a naphthyl group, a methylnaphthyl group, an anthracenyl group and a phenanthryl group. Of these, an alkyl group such as a methyl group, an ethyl group and a propyl group or an aryl group such as a phenyl group is preferable.

As the alkoxy group having 1 to 20 carbon atoms, an alkoxy group such as a methoxy group, an ethoxy group, a propoxy group and a butoxy group, a phenylmethoxy group, a phenylethoxy group, or the like can be given. As the aryloxy group having 6 to 20 carbon atoms, a phenoxy group, a methylphenoxy group, a dimethylphenoxy group, or the like can be given. As the amide group having 1 to 20 carbon atoms, an alkylamide group such as a dimethylamide group, a diethylamide group, a dipropylamide group, a dibutylamide group, and a dicyclohexylamide group and a methylethylamide group; an alkenylamide group such as a divinylamide group, a dipropenylamide group and icyclohexenyl; an arylalkylamide group such as a dibenzilamide group, a phenylethylamide group and a phenylpropylamide; and an arylamide group such as a diphenylamide group and a dinaphthylamide group, or the like can be given.

Examples of the silicon-containing group having from 1 to 20 carbon atoms include a mono-hydrocarbon-substituted silyl group such as a methylsilyl group, a phenylsilyl group, or the like; a di-hydrocarbon-substituted silyl group such as a dimethylsilyl group, a diphenylsilyl group, or the like; a tri-hydrocarbon-substituted silyl group such as a trimethylsilyl group, a triethylsilyl group, a tripropylsilyl group, a tricyclohexylsilyl group, triphenylsilyl group, a dimethylphenylsilyl group, a methyldiphenylsilyl group, a tritolylsilyl group, a trinaphthylsilyl group, or the like; a hydrocarbon-substituted silyl ether group such as a trimethylsilyl ether group, or the like; a silicon-substituted alkyl group such as a trimethylsilylmethyl group, or the like; and a silicon-substituted aryl group such as a trimethylsilylphenyl group, or the like. Of these, a trimethylsilylmethyl group, a phenyldimethylsilylethyl group, or the like is preferable.

Examples of the phosphide group having from 1 to 20 carbon atoms include an alkylsulfide group such as a methylsulfide group, an ethylsulfide group, a propylsulfide group, a butylsulfide group, a hexylsulfide group, a cyclohexylsulfide group, an octylsulfide group, or the like; an alkenylsulfide group such as a vinylsulfide group, a propenylsulfide group, a cyclohexenylsulfide group, or the like; an arylalkylsulfide group such as a benzylsulfide group, a phenylethylsulfide group, a phenylpropylsulfide group, or the like; and an arylsulfide group such as a phenylsulfide group, a tolylsulfide group, a dimethylphenylsulfide group, a trimethylphenylsulfide group, an ethylphenylsulfide group, a propylphenylsulfide group, a biphenylsulfide group, a naphthylsulfide group, a methylnaphthylsulfide group, an anthracenylsulfide group, a phenanthrylsulfide group, or the like.

Examples of the sulfide group having from 1 to 20 carbon atoms include an alkylsulfide group such as a methylsulfide group, an ethylsulfide group, a propylsulfide group, a butylsulfide group, a hexylsulfide group, a cyclohexylsulfide group, an octylsulfide group, or the like; an alkenylsulfide group such as a vinylsulfide group, a propenylsulfide group, a cyclohexenylsulfide group, or the like; an arylalkylsulfide group such as a benzylsulfide group, a phenylethylsulfide group, a phenylpropylsulfide group, or the like; and an arylsulfide group such as a phenylsulfide group, a tolylsulfide group, a dimethylphenylsulfide group, a trimethylphenylsulfide group, an ethylphenylsulfide group, a propylphenylsulfide group, a biphenylsulfide group, a naphthylsulfide group, a methylnaphthylsulfide group, an anthracenylsulfide group, a phenanthrylsulfide group, or the like.

Examples of the acyl group having from 1 to 20 carbon atoms include a formyl group; an alkylacyl such as an acetyl group, a propionyl group, a butyryl group, a valeryl group, a palmitoyl group, a stearoyl group, an oleoyl group, or the like; an arylacyl group such as a benzoyl group, a toluoyl group, a salicyloyl group, a cinnamoyl group, a naphthoyl group, a phthaloyl group, or the like; an oxalyl group, a malonyl group or a succinyl group derived from a dicarboxylic acid such as oxalic acid, malonic acid or succinic acid, or the like.

On the other hand, Y represents a Lewis base; plural Y's, if any, may be the same or different, and may crosslink with the other Y, $E^1$, $E^2$ or X. Examples of the Lewis base for Y include amines, ethers, phosphines, thioethers, or the like. Examples of the amines include amines having from 1 to 20 carbon atoms, specifically, alkylamines such as methylamine, ethylamine, propylamine, butylamine, cyclohexylamine, methylethylamine, dimethylamine, diethylamine, dipropylamine, dibutylamine, dicyclohexylamine, methylethylamine, or the like; alkenylamines such as vinylamine, propenylamine, cyclohexenylamine, divinylamine, dipropenylamine, dicyclohexenylamine, or the like; arylalkylamines such as phenylamine, phenylethylamine, phenylpropylamine, or the like; and arylamines such as diphenylamine, dinaphthylamine, or the like.

Examples of the ethers include aliphatic simple ether compounds such as methyl ether, ethyl ether, propyl ether, isopropyl ether, butyl ether, isobutyl ether, n-amyl ether, isoamyl ether, or the like; aliphatic composite ether compounds such as methyl ethyl ether, methyl propyl ether, methyl isopropyl ether, methyl n-amyl ether, methyl isoamyl ether, ethyl propyl ether, ethyl isopropyl ether, ethyl butyl ether, ethyl isobutyl ether, ethyl n-amyl ether, ethyl isoamyl ether, or the like; aliphatic unsaturated ether compounds such as vinyl ether, allyl ether, methyl vinyl ether, methyl allyl ether, ethyl vinyl ether, ethyl allyl ether, or the like; aromatic ether compounds such as anisole, phenetol, phenyl ether, benzyl ether, phenyl benzyl ether, α-naphthyl ether, β-naphthyl ether, or the like; and cyclic ether compounds such as ethylene oxide, propylene oxide, trimethylene oxide, tetrahydrofuran, tetrahydropyran, dioxane, or the like.

Examples of the phosphines include phosphines having from 1 to 20 carbon atoms. Specifically, they include monohydrocarbon-substituted phosphines such as methyl phosphine, ethyl phosphine, propyl phosphine, butyl phosphine, hexyl phosphine, cyclohexyl phosphine, octyl phosphine, or the like; di-hydrocarbon-substituted phosphines such as dimethyl phosphine, diethyl phosphine, dipropyl phosphine, dibutyl phosphine, dihexyl phosphine, dicyclohexyl phosphine, dioctyl phosphine, or the like; tri-hydrocarbon-substituted phosphines such as trimethyl phosphine, triethyl phosphine, tripropyl phosphine, tributyl phosphine, trihexyl phosphine, tricyclohexyl phosphine, trioctyl phosphine, or the like; monoalkenyl phosphines such as vinyl phosphine, propenyl phosphine, cyclohexenyl phosphine, or the like; dialkenyl phosphines substituted with two alkenyl groups on the hydrogen atoms of phosphine; trialkenyl phosphines substituted with three alkenyl groups on the hydrogen atoms of phosphine; arylalkyl phosphines such as benzyl phosphine, phenylethyl phosphine, phenylpropyl phosphine, or the like; diarylalkyl phosphines or aryldialkyl phosphines substituted with three aryl or alkenyl groups on the hydrogen atoms of phosphine; phenyl phosphine, tolyl phosphine, dimethylphenyl phosphine, trimethylphenyl phosphine, ethylphenyl phosphine, propylphenyl phosphine, biphenyl phosphine, naphthyl phosphine, methylnaphthyl phosphine, anthracenyl phosphine, phenanthryl phosphine; di(alkylaryl) phosphines substituted with two alkylaryl groups on the hydrogen atoms of phosphine; tri(alkylaryl) phosphines substituted with three alkylaryl groups on the hydrogen atoms of phosphine; or the like. Examples of the thioethers include the above-mentioned sulfides.

Next, $A^1$ and $A^2$ each are a divalent crosslinking group that bonds two ligands, representing a hydrocarbon group having from 1 to 20 carbon atoms, a halogen-containing hydrocarbon group having from 1 to 20 carbon atoms, a silicon-containing group, a germanium-containing group, a tin-containing group, —O—, —CO—, —S—, —SO$_2$—, —Se—, —NR$^1$—, —P(O)R$^1$—, —BR$^1$— or —AlR$^1$— where $R^1$ represents a hydrogen atom, a halogen atom, a hydrocarbon group having from 1 to 20 carbon atoms, or a halogen-containing hydrocarbon group having from 1 to 20 carbon atoms, and they may be the same or different. q indicates an integer of from 1 to 5, and is [(atomic valence of M)-2]; r indicates an integer of from 0 to 3.

Of those crosslinking groups, preferably, at least one is a crosslinking group comprising a hydrocarbon group having at least one carbon atom. Examples of such crosslinking group include, for example, a group represented by general formula (a). Specific examples thereof include a methylene group, an ethylene group, an ethylidene group, a propylidene group, an isopropylidene group, a cyclohexylidene group, a 1,2-cyclohexylene group, a vinylidene group (CH$_2$=C=), a dimethylsilylene group, a diphenylsilylene group, a methylphenylsilylene group, a dimethylgermylene group, a dimethylstannylene group, a tetramethyldisilylene group, a diphenyldisilylene group, or the like. Of those, preferred are an ethylene group, an isopropylidene group and a dimethylsilylene group.

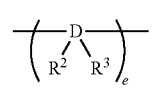

(a)

wherein D is an element belonging to Group 14 of the Periodic Table, carbon, silicon, germanium and tin, for example. $R^2$ and $R^3$ are independently a hydrogen atom or a hydrocarbon group having from 1 to 20 carbon atoms, which may be the same or different, or may be bonded to each other to form a cyclic structure. e indicates an integer of from 1 to 4.

As specific examples of the transition metal compounds represented by the general formula (I), specific examples mentioned in WO2008/066168 can be given. They may be a similar compound if a metal element belonging to other groups than Group 4. Preferred are transition metal compounds of a metal belonging to Group 4 of the Periodic Table, with a compound of zirconium being preferable.

Of the above-mentioned transition metal compounds of the general formula (I), preferred are compounds of general formula (II):

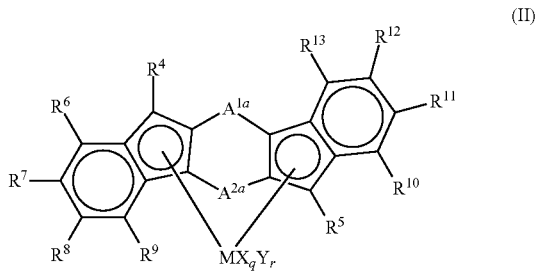

(II)

In above general formula (II), M represents a metal element of Groups 3 to 10 of the Periodic Table; $A^{1a}$ and $A^{2a}$ each represent the crosslinking group of the general formula (a) in the general formula (I), preferably $CH_2$, $CH_2CH_2$, $(CH_3)_2C$, $(CH_3)_2C(CH_3)_2C$, $(CH_3)_2Si$ or $(C_6H_5)_2Si$. $A^{1a}$ and $A^{2a}$ may be the same or different. $R^4$ to $R^{13}$ each represent a hydrogen atom, a halogen atom, a hydrocarbon group having from 1 to 20 carbon atoms, a halogen-containing hydrocarbon group having from 1 to 20 carbon atoms, a silicon-containing group, or a hetero atom-containing group. As the halogen atom, the hydrocarbon group having from 1 to 20 carbon atoms and the silicon-containing group, mentioned are the same as those mentioned in the above for the general formula (I). The halogen-containing hydrocarbon group having from 1 to 20 carbon atoms includes a p-fluorophenyl group, a 3,5-difluorophenyl group, a 3,4,5-trifluorophenyl group, a pentafluorophenyl group, a 3,5-bis(trifluoro)phenyl group, a fluorobutyl group, or the like. Examples of the heteroatom-containing group includes a hetero atom-containing group having from 1 to 20 carbon atoms, concretely a nitrogen-containing group such as a dimethylamino group, a diethylamino group, a diphenylamino group, or the like; a sulfur-containing group such as a phenylsulfide group, a methylsulfide group, or the like; a phosphorus-containing group such as a dimethylphosphino group, a diphenylphosphino group, or the like; and an oxygen-containing group such as a methoxy group, an ethoxy group, a phenoxy group, or the like. Of these, for $R^4$ and $R^5$, preferred is a group containing a hetero atom such as halogen, oxygen, silicon or the like, due to its high polymerization activity. For $R^6$ to $R^{13}$, preferred is a hydrogen atom or a hydrocarbon group having from 1 to 20 carbon atoms. X and Y are the same as in the general formula (I). q is an integer of from 1 to 5, indicating [(atomic valence of M)-2];
and r indicates an integer of from 0 to 3.

Of the transition metal compounds of the general formula (II), if the both indenyl groups are the same, as the transition metal compounds belonging to Group 4 of the Periodic Table, specific examples given in WO2008/066168 can be given. They may be a similar compound of a metal element belonging to other groups than Group 4. Preferred are transition metal compounds of a metal belonging to Group 4 of the Periodic Table, with a compound of zirconium being preferable.

Of the transition metal compounds represented by the general formula (II), if $R^5$ is a hydrogen atom and $R^4$ is not a hydrogen atom, as the transition metal compound of a transition metal belonging to Group 4 of the Periodic Table, specific examples given in WO2008/066168 can be given. They may be a similar compound of a metal element belonging to other groups than Group 4. Preferred are transition metal compounds of a metal belonging to Group 4 of the Periodic Table, with a compound of zirconium being preferable.

The compound (B) capable of reacting with the transition metal compound to form an ionic complex, which constitutes the catalyst for use in the present invention, is preferably a borate compound from the viewpoint that a highly-pure, terminally unsaturated olefin polymer having a relatively low molecular weight can be produced and from the viewpoint that the catalyst may have a high catalyst activity. Specific examples of the borate compound include those given in WO2008/066168. They may be used singly or in combination of two or more. In the case where the molar ratio of hydrogen to the transition metal compound (hydrogen/transition metal compound) to be mentioned below is 0 (zero), dimethylanilinium tetrakis(pentafluorophenyl)borate, triphenylcarbenium tetrakis(pentafluorophenyl)borate, methylanilinium tetrakis(perfluorophenyl)borate, or the like are preferable.

The catalyst used in the method for producing of the invention may be a combination of the above-mentioned component (A) and component (B). In addition to the above mentioned component (A) and component (B), an organoaluminum compound may be used as compound (C).

Examples of the organoaluminum compound of the component (C) include trimethylaluminum, triethylaluminum, tri-isopropylaluminum, tri-isobutylaluminum, tri-normal-hexylaluminum, tri-normal-octylaluminum, dimethylaluminum chloride, diethylaluminum chloride, methylaluminum dichloride, ethylaluminum dichloride, dimethylaluminum fluoride, diisobutylaluminum hydride, diethylaluminum hydride, ethylaluminum sesqui-chloride, or the like. These organoaluminum compounds may be used either singly or in combination.

Of those, preferred in the invention are trialkylaluminums such as trimethylaluminum, triethylaluminum, tri-isopropylaluminum, tri-isobutylaluminum, tri-normal-hexylaluminum, tri-normal-octylaluminum, or the like. More preferred are tri-isobutylaluminum, tri-normal-hexylaluminum and tri-normal-octylaluminum.

The amount of the component (A) to be used is generally from $0.1 \times 10^{-6}$ to $1.5 \times 10^{-5}$ mol/L, preferably from $0.15 \times 10^{-6}$ to $1.3 \times 10^{-5}$ mol/L, more preferably from $0.2 \times 10^{-6}$ to $1.2 \times 10^{-5}$ mol/L, particularly preferably from $0.3 \times 10^{-6}$ to $1.0 \times 10^{-5}$ mol/L. When the amount of the component (A) to be used is at least $0.1 \times 10^{-6}$ mol/L, then the catalyst may exhibit sufficiently catalyst activity; and when at most $1.5 \times 10^{-5}$ mol/L, then the polymerization heat may be readily removed.

The ratio in use of the component (A) to the component (B), (A)/(B), in terms of molar ratio, is preferably from 10/1 to 1/100, more preferably from 2/1 to 1/10. When (A)/(B) falls within a range of from 10/1 to 1/100, the catalyst can exhibit its effect and, in addition, the catalyst cost per the unit mass of polymer may be reduced. Further, there is no risk that a large amount of boron is present in the intended terminally unsaturated olefin polymer.

The ratio in use of the component (A) to the component (C), (A)/(C), in terms of molar ratio, is preferably from 1/1 to 1/10000, more preferably from 1/5 to 1/2000, even more preferably from 1/10 to 1/1000. The component (C), if any in the catalyst, may enhance the polymerization activity per transition metal of the catalyst. When (A)/(C) falls within a range of from 1/1 to 1/10000, then the effect brought by adding the component (C) and the economic aspect of the catalyst will be well-balanced, and in addition, there is no risk that a large amount of aluminum is present in the intended terminally unsaturated olefin polymer.

In the production method of the present invention, the component (A) and the component (B), or the component (A), the component (B) and the component (C) may be processed for pre-contact. The pre-contact may be attained, for example, by contacting the component (A) with the component (B); however, the method is not specifically restricted, and any known method is employable. The pre-contact may enhance the catalyst activity, or may be effective for catalyst cost reduction by reducing the amount of the catalyst promoter, the component (B) to be used.

By decomposing the raw material polyolefin in the atmosphere of an inert gas, the first terminally unsaturated polyolefin is produced. The decomposition is preferably a heat decomposition reaction or a radical decomposition reaction. A radical decomposition reaction is particularly preferable since a reaction proceeds under relatively moderate conditions.

The heat decomposition reaction is conducted by subjecting a raw material polyolefin to a heat treatment.

The heating temperature can be controlled by setting the intended molecular weight, taking into consideration the results of an experiment which was conducted in advance. The heating temperature is preferably 300 to 400° C., more preferably 310 to 390° C. If the heating temperature is lower than 300° C., the heat decomposition reaction may not proceed. On the other hand, if the heating temperature exceeds 400° C., the resulting terminally unsaturated polyolefin may be deteriorated.

The heat decomposition time (heat treatment time) is preferably 30 minutes to 10 hours, more preferably 60 to 240 minutes. If the heat decomposition time is shorter than 30 minutes, the amount of the resulting terminally unsaturated polyolefin may be small. On the other hand, if the heat decomposition exceeds 10 hours, the resulting terminally unsaturated polyolefin may be deteriorated.

The above-mentioned heat decomposition reaction can be conducted by a method in which, a stainless-made reactor provided with a stirrer is used as a heat decomposition apparatus, the apparatus is filled with an inert gas such as argon, raw material polyolefin is put and melted by heating, a molten polymer phase is subjected to bubbling by an inert gas to withdraw a volatile product, and the reactor is heated at a predetermined temperature for a predetermined period of time.

The radical decomposition reaction can be conducted by adding 0.05 to 2.0 mass % relative to the raw material polyolefin of an organic peroxide at 160 to 300° C.

The decomposition temperature is preferably 170 to 290° C., more preferably 180 to 280° C. If the decomposition temperature is lower than 160° C., the decomposition reaction may not proceed. On the other hand, if the decomposition temperature exceeds 300° C., decomposition occurs vigorously. As a result, decomposition may complete before an organic peroxide is dispersed uniformly and sufficiently in a molten polymer by stirring, whereby the yield may be lowered.

The organic peroxide to be added is preferably an organic peroxide having a one-minute half-life temperature of 140 to 270° C. As specific examples of the organic peroxide, the following compounds can be given: diisobutyryl peroxide, the cumylperoxy neodecanoate, di-n-propylperoxydicarbonate, diisopropyl peroxydicarbonate, di-sec-butyl peroxydicarbonate, 1,1,3,3-tetra-methylbutyl peroxydecanoate, di(4-t-butylcyclohexyl)peroxydicarbonate, di(2-ethylhexyl) paroxydicarbonate, t-hexyl-peroxyneodecanoate, t-butylperoxy neo-heptanoate, t-hexylperoxy pivarate, t-butylperoxy pivalate, di(3,5,5-trimethylhexanoyl)peroxide, dilauryl peroxide, 1,1,3,3-tetra-methylbutylperoxy-2-ethylhexanoate, 2,5-dimethyl 2,5-di(2-ethylhexanoylperoxy)hexane, t-hexylperoxy 2-ethylhexanoate, di(4-methyl benzoyl) peroxide, t-butylperoxy-2-ethylhexanoate, di(3-methylbenzoyl) peroxide, dibenzoylperoxide, 1,1-di(t-butylperoxy)-2-methylcyclohexane, 1,1-di(t-hexylpropylperoxy)-3,3,5-trimethylcyclohexane, 1,1-di(t-hexylperoxy)cyclohexane, 1,1-di(t-butylperoxy)cyclohexane, 2,2-di(4,4-di(t-butylperoxy) cyclohexyl)propane, t-hexylperoxyisopropylmonocarbonate, t-butylperoxy maleic acid, t-butylperoxy-3,5,5-trimethylhexanate, t-butylperoxy laurate, t-butyl peroxyisopropylmonocarbonate, t-butylperoxy-2-ethylhexyl monocarbonate, t-hexyl peroxybenzoate, 3,5-dimethyl-2,5-di(benzoylperoxy)hexane, t-butylperoxy acetate, 2,2-di(t-butylperoxy)butane, t-butylperoxy benzoate, n-butyl-4,4-di(t-butylperoxy)valate, di(2-t-butylperoxyisopropyl)benzoate, dicumyl peroxide, di-t-hexyl peroxide, 2,5-dimethyl-2,5-di(t-butylperoxy)hexane, t-butylcumyl peroxide, di-t-butyl peroxide, p-Menthans hydroperoxide, 2,5-dimethyl-2,5-di(t-butylperoxy)hexine-3, diisopropylbenzene hydroperoxide, 1,1,3,3-tetra-methylbutyl hydroperoxide, cumene hydroperoxide, and t-butyl hydroperoxide.

The added amount of an organic peroxide is preferably 0.1 to 1.8 mass %, more preferably 0.2 to 1.7 mass %, relative to the raw material polyolefin. If the added amount is less than 0.05 mass %, the decomposition reaction speed may be lowered, resulting in a poor production efficiency. On the other hand, if the added amount exceeds 2.0 mass %, offensive odor caused by the decomposition of an organic peroxide may be problematic.

The decomposition time of the decomposition reaction is 30 seconds to 10 hours, for example, preferably 1 minute to 1 hour. If the decomposition time is shorter than 30 seconds, not only the decomposition reaction may not proceed sufficiently, but also a large amount of organic peroxide may remain un-decomposed. On the other hand, if the decomposition time exceeds 10 hours, a cross-linking reaction as a side reaction may proceed, or the resulting polyolefin may turn yellow.

The radical decomposition reaction can be conducted by using the decomposition by the batch method or the decomposition by the melt continuation method.

When the radical decomposition reaction is conducted by the batch method, a stainless steel-made reaction apparatus is filled with an inert gas such as nitrogen and argon. Then, raw material polyolefin is put to allow the resultant mixture to be molten by heating. To the molten raw material polyolefin, an organic peroxide is added dropwise, followed by heating at a predetermined temperature for a predetermined period of time, whereby a radical heat decomposition reaction can be conducted.

An organic peroxide may be added dropwise within the range of the above-mentioned decomposition time, and the dropwise addition may be conducted either continuously or in a divided manner. The reaction time from the completion of the dropwise addition may be within the above-mentioned reaction time.

An organic peroxide may be added in the form of a solution after being dissolved in a solvent.

The solvent is preferably a hydrocarbon-based solvent. Specific examples thereof include aliphatic hydrocarbons such as heptane, octane, decane, dodecane, tetradecane, hexadecane and nonadecane; alicyclic hydrocarbons such as methylcyclopentane, cyclohexane, methylcyclohexane, cyclooctane and cyclododecane; and aromatic hydrocarbons such as benzene, toluene, xylene, ethylbenzene and trimethylbenzene. Of these solvents, a solvent having a boiling point of 100° C. or higher is preferable.

During the decomposition, the raw material polyolefin may be dissolved in a solvent. The decomposition temperature when the raw material polyolefin is dissolved in a solvent is normally 100 to 250° C., preferably 120 to 200° C.

When the radical decomposition reaction is conducted by the melt continuation reaction, the reaction time in respect of the average retention time is 20 seconds to 10 minutes, for example. By the melt continuation method, as compared with the batch method, a good mixing state can be attained, whereby the reaction time can be shortened.

As the apparatus, a monoaxial or biaxial melt extruder can be used. It is preferable to use an extruder having an inlet in the middle of a barrel, being capable of conducting evacuation and having an L/D of 10 or more.

As the radical decomposition reaction by the melt continuation method, a method by using the above-mentioned device, in which an organic peroxide is immersed in the raw material polyolefin or a method in which the raw material polyolefin and an organic peroxide are separately supplied and mixed can be applied.

Immersion of an organic peroxide in the raw material polyolefin can be specifically conducted as follows. A specific amount of an organic peroxide is added to the raw material polyolefin in the presence of an inert gas such as nitrogen, followed by stirring at a temperature of room temperature to 40° C., whereby the organic peroxide is allowed to be absorbed and immersed uniformly in raw material pellets. By decomposing the raw material polyolefin in which the resulting organic peroxide has been immersed (immersed pellets) by melt extrusion or by adding the immersed pellets to the raw material polyolefin as the masterbatch, the terminally unsaturated polyolefin can be obtained.

In the meantime, if the organic peroxide is a solid or the organic peroxide has a low solubility to the raw material polyolefin, the organic peroxide may be absorbed and immersed in the raw material polyolefin as a solution obtained by dissolving the organic peroxide in a hydrocarbon solvent in advance.

Mixing by supplying individually the raw material polyolefin and the organic peroxide can be conducted by supplying the raw material polyolefin and the organic peroxide at a fixed flow rate to the hopper part of the extruder or supplying the organic peroxide in the middle of the barrel at a fixed flow rate.

[Second Terminally Unsaturated Polyolefin]

The second terminally unsaturated polyolefin of the invention is a terminally unsaturated polyolefin obtained by decomposing a raw material polyolefin selected from a propylene homopolymer; a propylene-based copolymer comprising propylene, ethylene and one or more α-olefins each having 4 to 10 carbon atoms and containing ethylene and the α-olefins each having 4 to 10 carbon atoms in an amount of 10 mol % or less; a butene-1 homopolymer; and a butene-1-based copolymer comprising butene-1, ethylene, propylene and one or more α-olefins each having 5 to 10 carbon atoms and containing ethylene, propylene and the α-olefins each having 5 to 10 carbon atoms in an amount of 10 mol % or less; and satisfies the following (7) to (10):

(7) the number of terminal vinylidene groups per molecule (fv) is 1.3 to 2.5;

(8) fv≥−2(Mp/Mm)+2 wherein Mp is the number average molecular weight and Mm is the number average molecular weight of raw material polyolefin, and Mp/Mm is 0.05 to 0.8;

(9) The weight average molecular weight Mw is 500 to 100,000; and

(10) The molecular weight distribution Mw/Mn is 1.1 to 2.6

The above-mentioned propylene-based polymer (propylene homopolymer and propylene-based copolymer) and the above-mentioned butane-based polymer (butene-1 homopolymer and butene-1-based copolymer) which are the raw material polyolefin of the second terminally unsaturated polyolefin of the invention are the same as the propylene-based polymer and the butene-based polymer of the first terminally unsaturated polyolefin.

The weight average molecular weight of the raw material polyolefin is preferably 4000 to 1,000,000, more preferably 10,000 to 800,000.

If the weight average molecular weight is less than 4000, the number of the terminal vinylidene group of the terminally unsaturated polyolefin is not sufficiently increased, whereby the amount of the volatile components as the bi-product may increase. On the other hand, when the weight average molecular weight of the raw material polyolefin exceeds 1,000,000, the melt viscosity is high, exerting adverse effects on the stirring.

The raw material polyolefin is preferably a polyolefin having a terminal unsaturated group, more preferably a polyolefin having a terminal vinylidene group.

If the raw material polyolefin is polyolefin having a terminal vinylidene group, the number of the terminal vinylidene groups per molecule is preferably 0.4 to 1.0, more preferably 0.5 to 1.0, and further preferably 0.6 to 1.0.

If the number of terminal vinylidene groups per molecule of the raw material polyolefin is less than 0.4, the decomposition rate (Mp/Mm) is required to be increased in order to increase the number of terminal vinylidene groups of the resulting second terminally unsaturated polyolefin. As a result, not only the amount of the bi-product may be increased, but also the production of the terminally unsaturated polyolefin which has a high molecular weight and has a desired number of terminal vinylidene groups may become difficult.

The method for producing the raw material polyolefin is the same as that for the raw material polyolefin used in the production of the first terminally unsaturated polyolefin. That is, it can be produced by using a metallocene catalyst composed of a combination of the following components (A), (B) and (C) disclosed in WO2008/047860 and by using hydrogen as a molecular weight controller.

(A) A transition metal compound having a cyclopentadienyl group, a substituted cyclopentadienyl group, an indenyl group or a substituted indenyl group and containing a metal element of Groups 3 to 10 of the Periodic Table;

(B) A compound capable of reacting with the transition metal compound to form an ionic complex; and (C) An organoaluminum compound.

If the tacticity [mmmm] of the raw material polyolefin used in the production of the second terminally unsaturated polyolefin is 20 to 80 mol %, the raw material polyolefin can be produced by polymerizing by using a borate compound as the component (B) in the absence of hydrogen or by using only a small amount of hydrogen, or by using methylaminoxane as the component (B) in the absence of hydrogen.

The catalyst used in the production of the raw material polyolefin is not limited to a metallocene catalyst disclosed in WO2008/047860, and the following catalysts can be used.

Catalyst represented by the following formulas (A-2), (A-3) or (A-4)

  (A-2)

  (A-3)

  (A-4)

wherein $M^1$ is a transition metal belonging to Group 4 of the Periodic Table,

Cp is a group selected from a cyclopentadienyl group, a substituted cyclopentadienyl group, an indenyl group, a substituted indenyl group, a tetrahydroindenyl group, a substituted tetrahydroindenyl group, a fluorenyl group, a substituted fluorenyl group, an octahydrofluorenyl group, a substituted octahydrofluorenyl group and an azulenyl group.

$R^5$, $R^6$ and $R^7$ are independently a ligand, and A is crosslinking by covalent bonding;

e, f and g are independently an integer of 0 to 3, and h and i are independently an integer of 0 to 2, provided that e, f and g are not simultaneously 0, and h and i are not simultaneously 0;

Two or more of $R^5$, $R^6$ and $R^7$ may be combined with each other to form a ring. Further, in the formulas (A-3) and (A-4), two Cps may be the same or different from each other.

Specific examples of the catalyst represented by the formulas (A-2), (A-3) or (A-4) include bis(cyclopentadienyl) zirconium dichloride, bis(cyclopentadienyl)zirconiumdimethyl, bis(cyclopentadienyl)zirconium dihalide, bis (methylcyclopentadienyl)zirconium dichloride, bis (pentamethylcyclopentadienyl)zirconium dichloride, isopropylidene(cyclopentadienyl)(fluorenyl)zirconium dichloride, ethylene-bis(indenyl)zirconium dichloride, and dimethylsilyl-bis(indenyl)zirconium dichloride.

Catalyst Represented by the Following Formula (A-5)

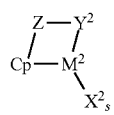

(A-5)

wherein $M^2$ is a titanium atom, a zirconium atom or a hafnium atom.

Cp is a cyclic unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group or a straight-chain unsaturated hydrocarbon group;

$X^2$ is a hydrogen atom, a halogen atom, an alkyl group having 1 to 20 carbon atoms, an aryl group having 6 to 20 carbon atoms, an alkylaryl group having 6 to 20 carbon atoms, an arylalkyl group having 6 to 20 carbon atoms or an alkoxy group having 1 to 20 carbon atoms.

Z is $SiR^9_2$, $CR^9_2$, $SiR^9_2SiR^9_2$, $CR^9_2CR^9_2$, $CR^9_2CR^9_2CR^9_2$, $CR^9=CR^9$, $CR^9_2SiR^9_2$ or $GeR^9_2$, $Y^2$ is —N($R^{10}$)—, —O—, —S— or —P($R^{10}$)—.

$R^9$ is a group selected from a hydrogen atom or an alkyl group, an aryl group, a silyl group, a halogenated alkyl group or a halogenated aryl group having up to 20 non-hydrogen atoms or its combination, $R^{10}$ is an alkyl group having 1 to 10 carbon atoms or an aryl group having 6 to 10 carbon atom or may form a bonding structure having up to 30 non-hydrogen atoms with one or more $R^9$.

s is 1 or 2.

Specific examples of the catalyst represented by the formula (A-5) include (tertiary butylamide)(tetramethyl-η5-cyclopentadienyl)-1,2-ethanediylzirconium dichloride: (tertiary butylamide)(tetramethyl-η5-cyclopentadienyl)-1,2-ethanediyl titanium dichloride; (methylamide)(tetramethyl-η5-cyclopentadienyl)-1,2-ethandiyl zirconium dichloride: (methylamide)(tetramethyl-η5-cyclopentadienyl)-1,2-ethanediyl titanium dichloride; (ethylamide)(tetramethyl-η5-cyclopentadienyl)methylene titanium dichloride: (tertiary butylamide)dimethy(tetramethyl-η5-cyclopentadienyl) silane titanium dichloride: (tertiary butylamide)dimethyl(2-indenyl)silane titanium dichloride: (tertiary butylamide) dimethyl(tetramethyl-η5-cyclopentadienyl)silane zirconium dibenzyl: (benzylamide)dimethyl(tetramethyl-η5-cyclopentdienyl)silane titanium dichloride; and (phenylphosphide)dimethyl(tetramethyl-η5-cyclopentadienyl)silane zirconium dibenzyl.

A catalyst in which $M^2$ is a titanium atom is preferable.

When a catalyst represented by the formulas (A-2), (A-3), (A-4) and (A-5) is used, it is possible to obtain terminally unsaturated polyolefin without using hydrogen.

If catalytic activity is low, the activity can be enhanced without decreasing significantly the generated amount of the terminal vinylidene group by adding an extremely small amount of hydrogen to a polymerization reaction site.

The number of the terminal vinylidene group per molecule and the weight average molecular weight of the second terminally unsaturated polyolefin are the same as those of the first terminally unsaturated polyolefin.

The second terminally unsaturated polyolefin satisfies the following formula:

$$fv \geq -2(Mp/Mm)+2 \qquad (8)$$

wherein Mp is the number average molecular weight of the terminally unsaturated polyolefin and Mm is the number average molecular weight of the raw material polyolefin; and Mp/Mn is 0.05 to 0.8.

If the terminally saturated raw material polyolefin is used, the number of the terminal vinylidene groups (fv) per molecule of the terminally unsaturated polyolefin generated by decomposition is small. In order to increase fv, it is effective to increase the decomposition rate to allow the polyolefin to have a low molecular weight. However, this method has a limit in obtaining the terminally unsaturated polyolefin having a large molecular weight.

The above formula (8) shows that, by using the raw material polyolefin already having a terminally unsaturated group, at the same decomposition rate, the number of the terminal unsaturated group is high, and shows that, even when compared at the same molecular weight, polyolefin having a large number of terminal unsaturated groups is generated.

In the above-mentioned formula, Mp/Mm is an index corresponding to the decomposition ratio.

Mp/Mm is 0.05 to 0.8, for example, preferably 0.06 to 0.7. If Mp/Mm is less than 0.05, the decomposition ratio is high, and as a result, a large amount of side products may be generated. On the other hand, when Mp/Mm exceeds 0.8, the number of the terminal vinylidene groups is small, and as a result, sufficient heat resistance may not be obtained when using polyolefin as an adhesive or the like.

The second terminally unsaturated polyolefin has a molecular weight distribution Mw/Mn of 1.1 to 2.6, preferably 1.1 to 2.55, more preferably 1.1 to 2.5.

Production of a terminally unsaturated polyolefin having a molecular weight distribution of less than 1.1 is technically difficult. If the molecular weight distribution exceeds 2.6, it means that the amount of low-molecular weight polyolefin is increased, whereby mechanical properties may be lowered.

The second terminally unsaturated polyolefin is preferably a polyolefin obtained by decomposing a propylene homopolymer or a propylene-based copolymer, more preferably by decomposing a propylene homopolymer. These propylene homopolymer and propylene-based copolymer each have an atactic structure, a syndiotactic structure or an isotactic structure.

The syndiotactic structure means that [rrrr] of polyolefin is 30 to 95 mol %, and the isotactic structure means that [mmmm] of polyolefin is 30 to 95 mol %.

The decomposition of the raw material polyolefin is the same as the raw material polyolefin in the production of the first terminally unsaturated polyolefin. It is preferred that the raw material polyolefin be decomposed by the heat decomposition method or the radical decomposition method.

However, when the decomposition reaction is conducted by the radical decomposition reaction by the melt continuation method and an organic peroxide is immersed in the raw material polyolefin, if the raw material polyolefin has a highly tactic (mmmm≥90 mol % or rrrr≥90 mol %), the immersion properties may be lowered.

The first and second terminally unsaturated polyolefins of the invention preferably are a functional polyolefin in which 5 mol % or more of the terminal vinylidene group has a functional group, more preferably a functional polyolefin in which 10 mol % or more of the terminal vinylidene group has a functional group.

The functional group is preferably one or more selected from a hydroxyl group, an epoxy group, an alkoxysilicon group, an alkylsilicon group, a carboxyl group, an amino group and an isocyanate group.

The first and second terminally unsaturated polyolefins of the invention preferably have an acid anhydride structure. An acid anhydride structure means a structure in which one molecule of water is removed from two carboxyl groups of carboxylic acid and two acyl groups share one hydrogen atom. Normally, it is represented by $R^1COOCOR^2$. For example, maleic anhydride, succinic anhydride and phthalic anhydride or the like can be given.

Since the terminally unsaturated polyolefin has a functional group, compatibility with and dispersibility in a polar compound can be improved. As a result, it becomes easy to obtain a composition of various polymers. Further, due to the presence of a functional group in the terminally unsaturated polyolefin, dissolution or dispersibility in a polar solvent such as water can be improved, whereby it can be used as an emulsion-based adhesive or a paint. As application to a polyolefin-based material, adhesiveness and coating properties can be imparted. In addition, in order to improve the surface conditions of an organic or inorganic pigment, it is also possible to produce a polyolefin-based master batch. In the case of an alkoxy silicon group or the like, heat resistance can be imparted by cross linking.

As for the method for introducing a functional group, en-addition reaction of maleic anhydride; introduction of a hydroxyl group by formic acid/hydrogen peroxide; epoxylation of peroxyacetic acid; introduction of an alkoxysilicon group by a reaction with an alkoxysilane such as trimethoxysilane, triethoxysilane, triisopropoxysilane, methyldimethoxysilane, ethyldiethoxysilane, and phenyldimethoxysilane and phenydiethoxysilane; introduction of an alkoxysilicon group by a reaction with an alkylsilane such as trinormalhexylsilane and trinormaloctylsilame; carboxylation by copper bromide/tert-butylperoxyacetate; introduction of an amino group by a reaction of maleic anhydride and a diamine compound; introduction of an isocyanate group by a reaction of maleic anhydride and a diisocyanate compound, or the like, can be considered.

As for the method for introducing a functional group, in addition to those mentioned above, hydroboration by $BH_3.THF$; boration by 9-boranebicyclo[3,3,1]nonane; metallation by isobutylaluminum hydride or the like; halogenation by dibromde or hydrogen bromide; hydroformylation by a formic acid/cobalt-based catalyst; aldehydration by a carbon monooxide/dicobalt octacarbonyl catalyst; sulfonation by acetic anhydride/sulfuric acid, or the like can be given.

A modified polymer obtained by reacting the functional polyolefin of the invention and a polyfunctional compound having two or more functional groups can be used as a sealing material, a potting material, a reactive hot melt adhesive, a paint or the like.

Examples of the above-mentioned polyfunctional compound having two or more functional groups include water; an isocyanate compound such as TDI and MDI; an amine compound such as hexamethylenediamine; polyethylene glycol and polypropylene glycol containing a terminal hydroxyl group; a polybutadiene modified product containing a terminal epoxy group; and polyacrylic acid and an acrylic acid copolymer.

A reaction of a functional polyolefin and a polyfunctional compound having two or more functional groups can be conducted according to a commonly used method. For example, it can be conducted by a method disclosed in JP-A-2009-185171.

Specifically, in the case where the functional group of the functional polyolefin is a hydroxyl group, as preferable examples of the polyfuctional group having two or more functional groups, a compound having an isocyanate group, a carboxylic acid group or an epoxy group can be given. Similarly, in the case where the functional group is an epoxy group, as preferable examples of the polyfunctional group, a compound having a hydroxyl group, an amino group or an isocyanate group can be given. In the case where the functional group is as alkoxysilicon, a compound having a hydroxyl group such as water can be given. In the case where the functional group is a carboxyl group, a compound having a hydroxyl group, an epoxy group or an amino group can be given. In the case where the functional group is an amino group, a compound having an epoxy group, an isocyanate group and a carboxyl group can be given. In the case where the functional group is an isocyanate group, a compound having active hydrogen such as a hydroxyl group and an amino group can be given. In the case of an acid anhydride structure, as preferable examples of the functional group, a hydroxyl group, an amino group, an epoxy group and an isocyanate group can be given.

A cross-linked body obtained by subjecting the functional polyolefin containing an alkoxysilicon group to wet curing can be used as a sealing material, a potting material, a reactive hot melt adhesive or the like.

The wet curing of the functional polyolefin containing an alkoxysilicon group as a functional group can be normally conducted by a treatment in which it is allowed to contact with water or moisture. As the curing catalyst used in this treatment, a silanol condensation catalyst may be used.

As the silanol condensation catalyst, an organic metal catalyst, a tertiary amine or the like can be given. As the organic metals, dibutyltin dilaurate, dibutyltin diacetate, dibutyltin dioctate, tin octate, lead octate, lead naphthenate, or the like can be given. As the tertiary amine, N-triethylamine and N-methylmorpholine bis(2-dimethylaminoethyl)ether, N,N,N',N",N",N"'-pentamethyldiethylenetriamine, N,N,N'-trimethylaminoethyl ethanolamine, bis(2-dimethylaminoethyl)ether, N-methyl-N'-dimethylaminoethylpiperadine and an imidazole compound in which the secondary amine functional group of the imidazole ring is substituted by a cyanoethyl group or the like can be given. These catalysts can be used singly or in combination of two or more.

Of the above-mentioned catalysts, dibutyltin dilaurate, dibutyltin diacetate and dibutyltin dioctate are particularly preferable. They are contained normally in an amount of 0.005 to 2.0 mass %, preferably 0.01 to 0.5 mass %, relative to the amount of the graft copolymer. The curing reaction is affected also by the temperature. The reaction proceeds slowly if the temperature is low, and when the reaction is conducted at room temperature, a curing period of about a week is required.

The terminally unsaturated polyolefin obtained by reacting the first and second terminally unsaturated polyolefins of the invention with an organohydrogen polysiloxane having two or more SiH groups per molecule has a high solubility in a solvent and a high heat resistance. Accordingly, the terminally unsaturated polyolefin can surface treat a filler not only in the molten state but also in the solution or emulsion state.

The residue of the terminally-modified unsaturated polyolefin which is generated by reacting the first and second terminally unsaturated polyolefins of the invention with an organohydrogen polysiloxane having two or more SiH groups per molecule is preferably a polysiloxane residue satisfying the following (a), (b) and (c):

(a) Having a siloxane terminal (A unit) represented by the formula (A) or a siloxane main chain (B unit) represented by the formula (B) or having the both structures;
(b) Having a siloxane repeating unit (C unit) represented by the formula (C) in the polysiloxane molecule main chain;
(c) The number of A unit is 0 to 2 per molecule, and the number of B unit is 0 to 10 per molecule, provided that the number of A unit and the number of B unit are not simultaneously 0. The total of A unit, B unit and C unit is 5 to 1500, preferably 5 to 200, more preferably 10 to 150, per molecule. The polysiloxane terminal other than the bonding position with polyolefin is $R^7$ or $OR^8$ ($R^7$ and $R^8$ are independently unsubstituted or substituted monovalent hydrocarbon group having 1 to 12 carbon atoms).

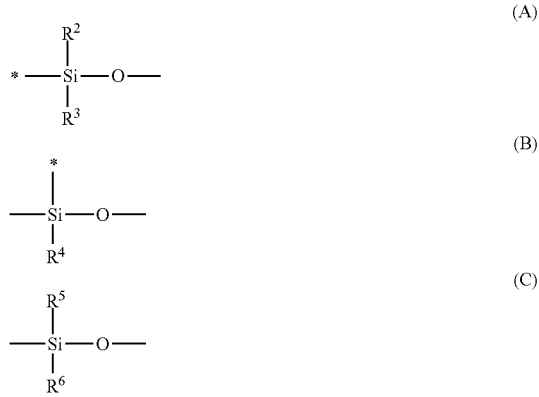

wherein $R^2$ to $R^6$ are independently a substituted or unsubstituted hydrocarbon group having 1 to 12 carbon atoms; and *—Si is a bonding position with polyolefin.

As the unsubstituted monovalent hydrocarbon group having 1 to 12 carbon atoms represented by $R^2$ to $R^8$, a methyl group, an ethyl group, an isopropyl group, a phenyl group or the like can be given. Further, as the substituted monovalent hydrocarbon group having 1 to 12 carbon atoms, a hydrocarbon group obtained by substituting the above-mentioned hydrocarbon group by a hydrogen atom, an alkoxy group or an amino group can be given.

A unit mentioned above is a group corresponding to the reacted siloxane molecule terminal. B unit mentioned above is a group present on the main chain of the reacted siloxane molecule. The number of A unit, B unit and C unit mentioned above is an integer. However, if the polysiloxane residue satisfying (a) to (c) above has a molecular weight distribution, the numbers of A unit, B unit and C unit are indicated as an average value, and hence it becomes a positive number.

As the above-mentioned organohydrogen polysiloxane having two or more SiH groups per molecule, polydimethysiloxane terminated at one end with hydride, molecular chain end-capped trimethylsiloxy methyl hydrogen polysiloxane, a molecular chain end-capped trimethylsiloxy dimethylsiloxane/methylhydrogen siloxane copolymer, a molecular chain end capped silanol methylhydrogen polysiloxane, a molecular chain end-capped silanol dimethylsiloxane/methylhydrogen siloxane copolymer, a molecular chain end-happed dimethylhydrogen siloxy dimethylpolysiloxane, a molecular chain end-capped dimethylhydrogen siloxy methylhydrogen polysiloxane, a molecular chain end-capped dimethylhydrogen siloxy dimethyl siloxane methylhydrogen siloxane copolymer, or the like can be given.

The polysilxane residue can be appropriately selected according to the application purpose of the terminally-modified polyolefin. When terminally-modified poly α-olefin is used in applications where a resin is imparted with lubrication properties or wear resistance, a residue of polydimethysiloxane terminated at one end with hydride is preferable. Further, if melting properties, mechanical properties such as flexibility and impact strength and gas permeability are imparted to a resin, a polysiloxane residue having 2 to 10 hydride bond residues is preferable. Further, when a terminally-modified polyolefin is used for treating an inorganic filler, a polysiloxane residue containing an alkoxy group is preferable.

[Graft Copolymer]

The graft copolymer of the invention which is obtained by graft copolymerization by using the first and second terminally unsaturated polyolefins of the invention is a graft copolymer which is composed of a side chain polyolefin chain which does not contain an irregular structure such as a cross linking structure and a main chain derived from a specific monomer and has a high degree of structure controllability, and hence, is useful as a dispersion improving agent or a compatibility accelerator for different materials.

The graft copolymer or a thermoplastic resin composition containing the graft copolymer can be obtained by graft polymerizing, 100 parts by mass of the combination of 20 to 100 mass % of the first or the second unsaturated polyolefin of the invention and 0 to 80 mass % of polyolefin other than the terminally unsaturated polyolefin, 0.2 to 300 parts by mass of one or more monomer selected from the following [I] to [IV] or 0.2 to 300 parts by mass of one or more monomer mixtures of one or more monomers selected from the following Group A and one or more monomers selected from the following Group B at 40 to 230° C. in the presence of 0.001 to 10 parts by mass of a radical polymerization initiator (Production Method I of Graft Copolymer). When the above-mentioned components are polymerized, there may be a case where only a graft copolymer may be obtained or, there may be a case where, in addition to a graft copolymer, a product (mixture) containing a thermoplastic resin obtained by polymerization of monomers which did not contribute to the graft polymerization is obtained.

[I] Acrylic acid and its derivatives
[II] Methacrylic acid and its derivatives
[III] Vinylester and its derivatives or alkoxyvinylsilane

[IV] Styrene and its derivatives
Group A:
[V] Maleic anhydride and substituted maleic anhydride
[VI] Maleic acid and its ester
[VII] Maleimide and substituted maleimide
Group B
[I] Acrylic acid and its derivatives
[II] Metacrylic acid and its derivatives
[III] Vinyl ester and its derivatives or alkoxyvinylsilane
[IV] Styrene and its derivatives
[VIII] α-olefin As the polyolefin other than the terminally unsaturated polyolefin, a polyolefin which substantially does not contain a terminal unsaturated group which is obtained by using a Ziegler catalyst, a metallocene catalyst or the like can be given.

For example, a polyolefin which does not contain an unsaturated group and is obtained by subjecting a reactive polyolefin containing an unsaturated group to a hydrogenation treatment, or a polyolefin obtained without using a polyene component. Specifically, a polyolefin of the following (1) to (3) can be given. Preferably, a polyolefin composed of the same olefin as that of the first or second terminally unsaturated polyolefin can be given.

(1) A polyethylene resin such as high density polyethylene (HDPE), low density polyethylene (LDPE) and L-LDPE
(2) Isotactic polypropylene, syndiotactic polypropylene, atactic polypropylene, a copolymer of propylene, ethylene and one or more of α-olefins each having 4 to 12 carbon atoms, block polypropylene or the like
(3) A polymer composed of one or more olefins each having 6 to 28 carbon atoms As combination of the first or second terminally unsaturated polyolefin of the invention with other polyolefin than these polyolefins, a melt mixture, a powdery mixture, a dry blend mixture such as a pellet, a solution obtained by dissolving in a hydrocarbon solvent or a mixture in these suspension state which is generated by cooling or re-precipitation after dissolution, of the first or second terminally unsaturated polyolefin and other polyolefin than the polyolefin can be given.

As the mixing ratio of the first or second terminally unsaturated polyolefin of the invention and other polyolefin than the polyolefin, 20 to 100 mass % of the first or second terminally unsaturated polyolefin and 0 to 80 mass % of other polyolefin than these polyolefin, preferably 30 to 100 mass % of the first or second terminally unsaturated polyolefin and 0 to 70 mass % of other polyolefin than these polyolefins, more preferably 40 to 100 mass % of the first or second terminally unsaturated polyolefin and 0 to 60 mass % of other polyolefin than these polyolefins, and further preferably 50 to 100 mass % of the first or second terminally unsaturated polyolefin and 0 to 50 mass % of other polyolefin than these polyolefins.

A content of the first or second terminally unsaturated polyolefin of 20 mass % or more is preferable since the amount of a graft copolymer after graft polymerization is increased.

In other respects, if a graft copolymer or a thermoplastic resin composition containing the copolymer (thermoplastic resin composition I) is added to a thermoplastic resin which is the same as a polyolefin other than the first or second terminally unsaturated polyolefin, it is preferred that the graft copolymer be present in a sufficient amount in a well-dispersed manner in a polyolefin other than the first or second terminally unsaturated polyolefin, since the graft copolymer is easily dispersed entirely in the resulting composition (thermoplastic resin composition II). Therefore, the content of polyolefin other than the first or second terminally unsaturated polyolefin of 80 mass % or less is preferable in respect of dispersiblity since the amount of the polyolefin becomes an adequate amount.

As the monomer, one or more selected from [I] to [IV] can be used. As the monomer shown by [I] to [IV], the following compounds can be given.

[I] Acrylic acid and its derivatives
(1) Acrylic acid
(2) Acrylic acid esters such as methyl acrylate, ethyl acrylate, butyl acrylate and normal octyl acrylate and 2-ethylhexyl acrylate, and long-chain polyalkylene glycol having a molecular weight of 30000 or less such as polyethylene glycol monoacrylate polyethylene glycol polypropylene glycol acrylate, poly(ethylene glycol-n-tetramethylene glycol) monoacrylete propylene glycol polybutylene monoacrylate and polypropylene glycol monoacrylate
(3) Acrylic acid metal salts composed of acrylic acid and a typical metal element such as sodium acrylate, potassium acrylate, magnesium acrylate and calcium acrylate
(4) Acrylic acid esters in which ester residues contain oxygen, nitrogen, sulfur and silicon, such as glycidyl acrylate, 2-hydroxyethyl acrylate, 2-hydroxypropyl acrylate, 2-hydroxy-3-phenoxypropyl acrylate, 4-hydroxybutyl acrylate, acryloyloxyethyl isocyanate, methacryoylloxyethyl isocyanate, 3-acryloxypropyl trimethoxysilane and 3-acryloxypropyl triethoxysilane; and a hydroxyl group-containing long-chain polyalkyleneglycol with a molecular weight of 30000 or less such as polyethylene glycol monoacrylate, polyethylene glycol polypropylene glycol acrylate, poly(ethylene glycol-n-tetramethylene glycol)monoacrylate, propylene glycol polybutylene glycol monoacrylate and polypropylene glycol monoacrylate.
(5) Acrylamide
(6) N-substituted acrylamide containing oxygen, nitrogen, sulfur and silicon in a substituent such as N-methylacrylamide, N-ethylacrylamide, N-isopropylacrylamide, N-cyclohexylacrylamide, N,N-dimethylacrylamide, N,N-diethylacrylamide, N,N-dibutylacrylamide, N,N-dicyclohexylacrylamide, N-(2-hydroxyethyl)-acrylamide, N-(2-hydroxypropyl)-acrylamide, N,N-dimethylaminoethylacrylamide and N-methylolacrylamide
(7) Acrylonitrile

[II] α-alkyl-substituted product of methacrylic acid and acrylic acid (hereinafter, they may comprehensively often be referred to as the "methacrylic acid"), and its derivatives A monomer having an alkyl group (preferably having up to 6 carbon atoms) such as a methyl group at the α position of the monomer shown by [I] above.

Vinylester and its derivatives or alkoxyvinylsilane

Vinylesters and its derivatives such as vinyl acetate, vinyl propionate, vinyl isolactate, vinyl pivalate, undecanoic acid vinyl ester, vinyl palmitate and its derivatives; alkoxyvinylsilane such as trimethoxyvinylsilane and triethoxyvinylsilane

[IV] Styrene and its derivatives

Alkylstyrenes such as α-methylstyrene, p-methylstyrene, p-ethylstyrene, p-propylstyrene, p-isopropylstyrene, p-butylstyrene, p-tert-butylstyrene, p-phenyl styrene, o-methylstyrene, o-ethylstyrene, o-propylstyrene, o-isopropylstyrene, m-methylstyrene, m-ethylstyrene, m-isopropylstyrene, m-butylstyrene, mesitylmethylene, 2,4-dimethylstyrene, 2,5-dimethylstyrene and 3,5-dimethylstyrene; alkoxystyrenes such as p-methoxystyrene, o-methoxystyrene and m-methoxystyrene, halogenated styrene such as p-chlorostyrene, m-chlorostyrene, o-bromostyrene, p-fluorostyrene, m-fluorostyrene, o-fluorostyrene, and o-methyl-p-fluorostyrene; styrene and its derivatives such as trimethylsilylstyrene and vinyl benzoate.

As preferable monomers and preferable combination of monomers, the following can be given.

[I] As acrylic acid and its derivatives, all of the above compounds are preferable, with all compounds except for acrylic metal salts being more preferable.

[II] Although graft polymerization is possible by using only methacryalic acid and its derivatives, by combining [I] acrylic acid and its derivatitives/[II] methacrylic acid and its derivatives, the graft polymerization amount of [II] methacrylic acids and its derivatives is preferably increased. In particular, combination of acrylic acid or acrylic esters and methacrylic acid or methacrylic acid esters are preferable.

A preferable molar ratio of [I] acrylic acid and its derivatives/[II] methacrylic acid and its derivatives ([I]/[II] (molar ratio)) is 0.1 to 2, preferably 0.2 to 1.5, more preferably 0.3 to 1.2, and further preferably 0.5 to 1.0.

If the ratio [I]/[II] (molar ratio) is 0.1 or more, the graft polymerization amount of [II] methacrylic acid and its derivatives is increased. A ratio [I]/[II] of 2 or less is preferable, since a copolymer composed of [I] acrylic acid and its derivatives/methacrylic acid its derivatives is not generated as a bi-product.

Although graft polymerization is possible only with styrene and its derivative, it is preferred that [I] acrylic acid and its derivatives/[VI] styrene and its derivative be combined, since the graft polymerization amount of styrene and its derivatives is increased. In particular, combination of acrylic acid or an acrylic acid ester and styrene or its derivative is preferable.

A preferable molar ratio of [I] acrylic acid and its derivatives/[VI] styrene and its derivatives ([I]/[VI] (molar ratio)) is 0.1 to 2, preferably 0.2 to 1.5, more preferably 0.3 to 1.2, and further preferably 0.5 to 1.0.

If the ratio [I]/[VI] (molar ratio) is 0.1 or more, the graft polymerization amount of [VI] styrene and its derivatives is increased. A ratio [I]/[VI] of 2 or less is preferable, since a copolymer composed of [I] acrylic acid and its derivatives and/or [VI] styrene and its derivatives is not generated as a bi-product.

The monomer composed of Group A and Group B is the following compound and the compound represented by the formulas [I], [II], [III] and [IV] are as mentioned above:

Group A: [V] Maleic anhydride and substituted maleic anhydride
[VI] Maleic acid and its ester
[VII] Maleimide and substituted maleimide Group B: [I] Acrylic acid and its derivative
[II] Methacrylic acid and its derivative
[III] Vinylester and its derivative or alkoxyvinylsilane
[IV] Styrene and its derivative
[VIII] α-olefin As the monomer represented by [V] to [VIII], the following compounds can be given.

[V] Maleic anhydride such as maleic methyl anhydride, maleic dimethyl anhydride, maleic phenyl anhydride and maleic diphenyl anhydride and its substituted product

[VI] Maleic acid and its esters such as methylmaleic acid, dimethyl maleate, diethyl maleate, dibutyl maleate, monomethyl maleate

[VII] Maleimide and substituted maleimide such as N-alkyl-substituted maleimide, N-methylmaleimide, N-ethylmaleimide and N-phenylmaleimide

[VIII] An α-olefin having 2 to 28 carbon atoms such as ethylene, propylene, 1-butene, 1-hexene, 1-heptene, 1-octene, 1-decene, 1-undecene, 1-dodecene, 1-tridecene, 1-tetradecene, 1-pentadenece, 1-hexadene, 1-heptadecene, 1-octadecene, 1-nonadecene and 1-eicosene.

As the monomer, one or more selected from the compounds of the above-mentioned Group A and Group B are used.

The monomers of Group A are monomers which are hardly polymerized with each other due to a small electron density of the double bond. Accordingly, in the invention, by polymerizing with a monomer of Group B, the content of the monomer of Group A is increased. In the invention, by using a monomer of Group A, the reactivity of the first and second terminally unsaturated polyolefins can be enhanced, whereby a graft copolymer can be produced efficiently.

An α-olefin having 2 to 28 carbon atoms [VIII] is selected taking into consideration the graft polymerization temperature and its relationship with the boiling point thereof. In the melt graft polymerization, if a polymerization reaction is conducted at a higher temperature, use of an α-olefin having a high boiling point is easy to handle in respect of reaction operation. Further, in the case of a graft polymerization using a solvent, it is possible to use from a gaseous α-olefin to an α-olefin having a high boiling point.

As for the combination of a compound of Group A and a compound of Group B, a compound of Group A/a compound of Group B (molar ratio) is normally about 0.1 to 2, preferably 0.5 to 1.5, more preferably 0.8 to 1.2, with 0.9 to 1.1 being further preferable.

If the molar ratio is 0.1 or more, the graft polymerization amount of a compound of Group A is increased. A molar ratio of 2 or less is preferable since a copolymer composed of a compound of Group A and a compound of Group B which does not relate to the graft polymerization is not generated as a bi-product.

As for combination of a compound of Group A and a compound of Group B, combination of [V] maleic anhydride and substituted maleic anhydride of Group A and a compound of Group B is preferable. Combination of [V] maleic anhydride of Group A and [I] acrylic acid and its derivatives, [III] vinyl ester and its derivatives or alkoxyvinylsilane or [VIII] α-olefin of Group B is more preferable.

No specific restrictions are imposed on the radical polymerization initiator used in the graft polymerization of the invention. A polymerization initiator can be appropriately selected from known radical polymerization initiators, e.g. various organic peroxides, azo-based compounds or the like. Both compounds are preferable radical polymerization initiators.

Examples of the organic peroxides include diacyl peroxides such as dibenzoyl peroxide, di-8,5,5-trimethylhexanoyl peroxide, dilauroyl peroxide, didecanoyl peroxide and di(2, 4-dichlorobenzoyl)peroxide, hydroperoxides such as t-butylhydro peroxide, cumene hydroperoxide, diisopropylbenzene hydroperoxide and 2,5-dimethylhexane-2,5-dihydroperoxide, dialkylperoxides such as di-t-butylperoxide, dicumylperoxide, 2,5-dimethyl-2,5-di(t-butylperoxy)hexane, 2,5-dimethyl-2,5-di(t-butylperoxy)hexine-3 and α,α' bis(t-butylperoxy)diisopropylbenezene, peroxy ketals such as 1,1-bis-t-butylperoxy-3,3,5-trimethylcyclohexane, 2,2-bis(t-butylperoxy)butane, alkylperesters such as, t-butyperoxyoctoate, t-butylperoxypivalate, t-butylperoxyneodecanoate and t-butyperoxy benzoate t-butyloxybenzoate, peroxycarbonates such as di-2-ethylhexylperoxydicarbonate, diisopropyl peroxydicarbonate and di-sec-butyl peroxydicarbonate, t-butylperoxyisopropyl carbonate. Of these, dialklyperoxide is preferable. As the azo-based compound, azobisisobutylnitrile, azobisisovaleronitrile or the like can be given. The radical polymerization initiators may be used singly or in combination of two or more.

No specific restrictions are imposed on the amount of the radical polymerization initiator in the graft polymerization reaction. An appropriate amount is selected according to desired properties of the graft copolymer or the thermoplastic resin composition containing the copolymer.

The radical polymerization initiator is used in an amount of 0.01 to 10 parts by mass, preferably 0.005 to 5 parts by mass relative to 100 parts by mass of the combination of the first or second terminally unsaturated polyolefin and other polyolefin than these polyolefin.

The amount of a monomer selected from [I] acrylic acid and its derivatives, [II] methacrylic acid and its derivatives, [III] vinyl ester and its derivatives or alkoxyvinylsilane, [IV] styrene and its derivatives, or Group A; [V] maleic anhydride and substituted maleic anhydride, [VI] maleic acid and its ester, [VII] maleimide and substituted maleimide, Group B; [I] acrylic acid and its derivatives, [II] methacrylic acid and its derivatives, [III] vinyl ester and its derivatives or alkoxysilane, [IV] styrene and its derivatives, [VIII] α-olefin is selected from in a range of 0.2 to 300 parts by mass according to the desired properties of the graft copolymer or the thermoplastic resin composition containing the copolymer.

The amount is preferably 1 to 250 parts by mass, more preferably 5 to 200 parts by mass, with 10 to 180 parts by mass being further preferable.

If the amount is 0.2 parts by mass or more, the amount of the monomer copolymerizing in the graft polymer is increased, a function such as compatibilizing or the like can be developed easily. An amount of 300 parts by mass or less is preferable since a polymer which does not relate to the graft polymerization is not generated as a bi-product.

Although no specific restrictions are imposed on the graft polymerization method, the first or second terminally unsaturated polyolefin, another polyolefin than these polyolefin and the above-mentioned monomer and the radical polymerization initiator are reacted by melt kneading by means of a roll mill, a banbury mixer, an extruder or the like, whereby a graft copolymer or a thermoplastic resin composition containing the copolymer can be produced.

The reaction is conducted at 40 to 230° C. for 0.01 to 0.5 hours. The graft polymerization reaction may be conducted in the co-presence of a Lewis acid. In this case, the temperature is preferably 40 to 140° C.

It is also possible to produce a graft copolymer or a thermoplastic resin composition containing the copolymer in the presence of a hydrocarbon-based solvent such as butane, pentane, hexane, cyclohexane and toluene, a halogenated hydrocarbon-based solvent such as chlorobenzene, dichlorobenzene and trichlorobenzene and a liquidified α-olefin or in the absence of a solvent.

As for the reaction conditions, if the reaction is conducted in the co-presence of a Lewis acid, the reaction is conducted at 20 to 230° C., preferably 40 to 140° C. for 0.1 to 10 hours.

If graft polymerization is conducted at high temperatures which are normally used, lowering of the molecular weight or viscosity due to the decomposition of the first or the second terminally unsaturated polyolelfin or generation of a gel by a cross linking reaction tend to occur easily. However, under the conditions of the invention, since graft polylmerization is conducted at normally low temperatures, lowering of the molecular weight or viscosity does not occur, and a side reaction such as a cross linking reaction does not proceed.

As the Lewis acid to be used in the graft polymerization of the invention, the following compounds can be given.

(1) A halide belong to the Group II to VI of the Periodic Table (chlorine, bromine, fluorine, iodine), an alkylated product (a hydrocarbon group having 1 to 20 carbon atoms), an alkyl halide (2) A Lewis acid composed of aluminum, boron, zinc, tin, magnesium and calcium Specific examples of the Lewis acid include magnesium chloride, calcium chloride, zinc chloride, boron trichloride, aluminum trichloride, gallium trichloride, silicon tetrachloride, a compound in which a chlorine atom is converted to a bromine atom and a fluorine atom, butylethyl magnesium, diethyl zinc, trimethyl aluminum, triethyl aluminum, triisobutyl aluminum, trinormalhexyl aluminum, trimethyl boron, triethyl boron, triethyl gallium, trimethyl gallium, diethylaluminum monochloride, ethylaluminum dichloride, and ethylaluminum sesquichloride. Of these, zinc compounds, aluminum compounds and boron compounds are preferable.

As for the amount of the Lewis acid in the graft polymerization reaction, the Lewis acid/monomer (mol/mol) is 0.01 to 1, preferably 0.05 to 1, more preferably 0.1 to 0.5.

Here, the monomer means a monomer selected from [I] acrylic acid and its derivatives, [II] methacrylic acid and its derivatives, [III] vinyl ester and its derivatives or alkoxyvinylsilane, [IV] styrene and its derivatives or Group A; [V] maleic anhydride and substituted maleic anhydride, [VI] maleic acid and its ester, [VII] maleimide and substituted maleimide, Group B; [I] acrylic acid and its derivatives, [II] methacrylic acid and its derivatives, [III] vinyl ester and its derivatives or alkoxyvinylsilane, [IV] styrene and its derivatives, and [VIII] α-olefin If the amount ratio of Lewis acid/monomer (mol/mol) is 0.01 or more, the grafting ratio is high. A ratio of 1 or less is preferable since no coloring occurs since removal of residue of Lewis acid by decalcification becomes unnecessary.

The Lewis acid is added before addition of a radical polymerization initiator to conduct a graft polymerization reaction. Alternatively, by using one obtained by allowing the monomers [I] to [VIII] to contact a Lewis acid, a graft polymerization reaction is conducted.

As for the above-mentioned graft copolymer or the thermoplastic resin composition containing the graft copolymer, in the above-mentioned production method, it is preferable to conduct graft polymerization in the presence of a chain transfer agent. By conducting graft polymerization in the presence of a chain transfer agent, melt fluidity of the graft copolymer can be improved. In particular, for heat resistant applications, it is possible to improve melt fluidity of the graft copolymer without lowering the heat resistance. Further, it has advantages that generation of a gel or a seeding as a side product can be prevented.

Herein below, production of a graft polymer in the copresence of a chain transfer agent will be explained.

(1) Definition of Chain Transfer Agent

A reagent which causes chain transfer reaction is called a "chain transfer agent". A chain transfer agent is a reaction reagent which receives a radical from a growing polymer to stop the growth of a polymer. A chain transfer agent which receives a radical can attack a monomer to start the polymerization again. A chain transfer agent is mainly used for controlling the molecular weight of the polymer. As for the chain transfer agent, according to the type of the polymerizable monomer which is used in combination, the type and amount can be appropriately selected. The efficiency of the chain transfer agent can be evaluated by the chain transfer constant.

As for the chain transfer constant of the chain transfer agent for each monomer, reference can be made to the third edition of the Polymer Handbook (edited by J. BRANDRUP and E.H. IMMERGUT, published by JOHN WILEY & SON), for example. The chain transfer constant can be obtained by an experiment with reference to Takayuki Otsu and Masaetsu Kinoshita "Experimental Method for Polymer Synthesis" published by Kagaku Dojin Co., Ltd. (1972).

(2) Specific Examples

Mercaptans are preferable as the chain transfer agent. Specifically, the following mercaptans can be given.
Alkylmercaptan such as isopropylmercaptan, n-butylmercaptan, t-butylmercaptan, n-octylmercaptan, n-dodecylmercaptan, t-dodecylmercaptan, n-pentylmercaptan and n-laurylmercaptan
Thiophenols such as thiophenolthio-β-naphthol, m-bromothiophenol, p-bromothiophenol, m-toluenethiol and p-toluenethiol
Mercaptans having an ester group such as 2-ethylhexyl mercaptoacetate and methoxybutyl mercaptoacetate
Mercaptan having an alkoxy silicon such as 3-mercaptopropyltrimethoxysilane and 3-mercaptopropyltriethoxysilane Of the above-mentioned mercaptanes, alkylmercaptan having a long-chain alkyl group or a mercaptan having a large molecular weight are preferable in respect of odor. Specific examples include n-octylmercaptan, n-dodecylmercaptan, t-dodecylmercaptan, n-pentylmercaptan, n-laurylmercaptan and 2-ethylhexyl mercaptoacetate. In applications where heat resistance is required, 3-mercaptopropyltrimethoxysilane and 3-mercaptopropyltriethoxysilane can be given.

(3) Amount of a Chain Transfer Agent

The amount of a chain transfer agent is 0.001 to 50 mass %, preferably 0.01 to 30 mass %, more preferably 0.1 to 15 mass %, relative to the monomer. If the amount of a chain transfer agent is 0.001 mass %, the control of the molecular weight is insufficient, and as a result, a gel-like product tends to be generated easily due to an increase in molecular weight. If the amount of a chain transfer agent exceeds 50 mass %, the molecular weight lowers significantly, and the length of a main chain composed of a monomer becomes shorter than that of a side chain. As a result, the adhesion strength or compatibilization performance is lowered.

The graft copolymer of the invention or a thermoplastic resin composition containing the graft copolymer is obtained by allowing a mixture in which a terminally unsaturated polyolefin (heat decomposable or radical decomposable low tactic polyolefin) and a monomer (a) which substantially does not have radical homopolymerizability are co-present to contact a monomer (b) which is co-polymerizable with the monomer (a) (see the method for producing a graft copolymer (II)).

According to the above-mentioned method, the reactivity of the monomers (a) and (b) are increased, whereby the process of separating an unreacted monomer can be omitted. Further, yellowing of a graft copolymer caused by a residual monomer can be eliminated.

The method for producing the graft copolymer using the above-mentioned monomers (a) and (b) (see the method for producing a graft copolymer (II)) will be explained below.

(1) Monomer (a)

(i) Definition of Monomer (a)

Monomer (a) is a monomer which is poor in radical homopolymerization properties and substantially does not have radical homopolymerization properties. More specific examples include the monomers shown below.

(ii) Specific Examples of Monomer (a)

Maleic anhydride and its substituted bodies are the same as [V] of Group A in the above-mentioned method for producing a graft copolymer I. Specific examples thereof include maleic anhydride such as maleic anhydride, methylmaleic anhydride, dimethylmaleic anhydride, henylmaleic anhydride and diphenylmaleic anhydride and substituted bodies thereof.
Maleic acid and its esters are the same as [VI] of Group A in the above-mentioned method for producing a graft copolymer I. Specific examples thereof include maleic acid and its esters such as maleic acid, methyl maleic acid, dimethyl maleic acid, diethyl maleic acid, dibutyl maleic acid, monomethyl maleic acid.
α-olefin is almost the same as [VIII] of Group B in the above-mentioned method for producing a graft copolymer I. Specific examples include an α-olefin having 2 to 28 carbon atoms such as ethylene, propylene, 1-butene, 1-hexene, 1-heptene, 1-octene, 1-decene, 1-undecene, 1-dodecene, 1-tridecene, 1-tetradecene, 1-pentadecene, 1-hexadecene, 1-heptadecence, 1-octadecene, 1-nonadecence, and 1-eicocene, and a branched olefin such as isobutene.
Vinylsilane and its substituted bodies. Specific examples include vinyltrimethoxysilane and vinyltriethoxysilane.

(2) Monomer (b)

(i) Definition of Monomer (b)

The monomer (b) is a monomer which is copolymerizable with the above-mentioned monomer (a) or a monomer which is copolymerizable with two or more selected from the above-mentioned monomers (a).

(ii) Specific Examples (A) When the monomer (a) is maleic anhydride or substituted maleic anhydride and the maleic acid and its esters
Vinyl Ester and its Derivatives
Except for vinylalkoxysilane, they are the same as [III] in the above-mentioned method for producing a graft copolymer I. Specific examples include vinyl esters and its derivatives such as vinyl acetate, vinyl propionate, vinyl isolactate, vinyl pivalate, vinyl undecanoate and vinyl palmitate.
α-olefin
The same α-olefins as those in the monomer (a) can be exemplified.
—Styrene and its Derivatives
The same as [IV] in the above-mentioned method for producing a graft copolymer I. Specific examples include alkylstyrenes such as α-methylstyrene, p-methylstyrene, p-ethylstyrene, p-propylstyrene, p-isobutylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene and 3,5-dimethylstyrene; alkoxystyrenes such as p-methoxystyrene, o-methoxystyrene and m-methixystyrene; halogenated styrenes such as p-chlorostyrene, o-chlorostyrene and m-chlorostyrene; p-fluorostyrene, m-fluorostyrene, o-fluorostyrene and o-methyl-p-fluorostyrene; and styrene such as trimethylsilylstyrene and vinyl benzoic acid and its derivatives.

—Acrylic Acid and its Derivatives
The same as [I] in the above-mentioned method for producing a graft copolymer I. Specific examples are given below.
(1) Acrylic acid
(2) Acrylic esters such as methyl acrylate, ethyl acrylate, butyl acrylate, normaloctyl acrylate and 2-ethylhexyl acrylate; long-chain polyalkylene glycols having a molecular weight of 30000 or less such as polyethylene glycol monoacrylate, polyethylene glycol polypropylene glycol acrylate, poly(ethylene glycol-n-tetramethylene glycol) monoacrylate, propylene glycol polybutylene glycol monoacrylate, and polypropylene glycol monoacrylate
(3) Acrylic acid metal salts composed of acrylic acid and a typical metal element such as sodium acrylate, potassium acrylate, magnesium acrylate and calcium acrylate
(4) Acrylic acid esters in which ester residues contain oxygen, nitrogen, sulfur and silicon, e.g. acrylic acid esters having a functional group such as glycidyl acrylate, 2-hydroxyethyl acrylate, 2-hydroxypropyl acrylate, 2-hydroxy-3-phenoxypropyl acrylate, 4-hydroxybutyl acrylate, acryloyloxyethyl isocyanate, methacryloyloxyethyl isocyanate, 3-acryloxypropyltrimethoxysilane and 3-acryloxypropyltriethoxysilane; long-chain polyalkylene glycol with a molecular weight of 30000 or less having a hydroxyl group such as polyethylene glycol monoacrylate, polyethylene glycol polypropylene glycol acrylate, poly(ethylene glycol-n-tetramethylene glycol)monoacrylate, propylene glycol polybutylene glycol monoacrylate and polypropylene glycol monoacrylate
(5) Acrylamide
(6) N-substituted acrylamide containing oxygen, nitrogen, sulfur and silicon in a subsituent, e.g. N-substituted acrylamide such as N-methylacrylamide, N-ethylacrylamide, N-isopropylacrylamide, N-cyclohexylacrylamide, N,N-dimethylacrylamide, N,N-diethylacrylamide, N,N-dibutylacrylamide, N,N-dicyclohexylacrylamide, N-(2-hydroxyethyl)-acrylamide, N-(2-hydroxypropyl)-acrylamide, N,N-dimethylaminoethylacrylamide, and N-methylolamide
(7) Acrylonitrile
α-alkyl substituted methacrylic acid and acrylic acid (hereinafter they may be comprehensively referred to as the "methacrylic acid derivatives") and its derivatives
The same as [II] in the above-mentioned method for producing a graft copolymer I. Specific examples thereof include monomers having an alkyl group such as a methyl group (preferably, an alkyl group having 6 or less carbon atoms) at the a position of the monomer exemplified as the acrylic acid and its derivative.
(B) When the Monomer (a) is α-olefin
Combination opposite to that mentioned in (A) above. Maleic anhydride, substituted maleic anhydride, and maleic acid and its esters can be given.
(C) When the Monomer (a) is Vinylsilane and Substituted Vinylsilane
—Acryl Acid and its Derivatives
The same as [I] in the above-mentioned method for producing a graft copolymer I.
—Styrene and its Derivatives
The same as [IV] in the above-mentioned method for producing a graft copolymer I.
(3) As preferable combination of the monomers (a) and (b), the following can be given.
(i) Maleic anhydride and substituted maleic anhydride/α-olefin
More preferably, maleic anhydride or maleic acid/α-olefin having 4 to 28 carbon atoms
Further preferably, maleic anhydride/α-olefin having 6 to 18 carbon atoms
(ii) Maleic anhydride and substituted maleic anhydride/acrylic acid and its derivatives
More preferably, maleic anhydride or maleic acid/acrylic acid, acrylic esters
Further preferably, maleic anhydride/acrylic acid, acrylic esters
(iii) Maleic anhydride and substituted maleic anhydride/vinyl ester and its derivatives
More preferably, maleic anhydride or maleic acid/vinyl acetate
Further preferably, maleic anhydride/vinyl acetate
(iv) Vinylsilane and substituted vinylsilane/acrylic acid and its derivatives
More preferably, vinyltrimethoxysilane, vinyltriethyoxysilane/acrylic acid ester, acrylonitrile (4) Amount Ratio of Monomer (a) and (b)

Mixing Ratio:Molar Ratio

Monomer (a)/monomer (b)=0.01 to 0.5, preferably 0.02 to 0.4, more preferably 0.03 to 0.35
If the amount ratio is less than 0.01, the content of the monomer (a) in the graft copolymer is lowered, whereby properties such as adhesiveness are lowered. If the amount ratio exceeds 0.5, the monomer (a) remains as an un-reacted product, thereby causing a problem such as coloring and an increase in production cost.

(5) Details of the Method for Producing a Graft Copolymer II (i) Basic Production Method
A mixture (#) in which the total amount of the monomer (a) is co-present with a heat decomposed product or a radical decomposed product of the terminally unsaturated polyolefin of the invention (hereinafter referred to as a heat decomposed product or a radical decomposed product) is allowed to be in contact with the monomer (b) to conduct graft copolymerization. It is preferred that the monomer (b) be added to the mixture (#), and that the addition time be 20 minutes or more and at longest, a period of time during which at least 98% of the radical polymerization initiator is decomposed (normally within 48 hours).
(ii) Specific Method
(A) When a Solvent is Used
1) A method in which, to a solution obtained by dissolving a decomposed product or a radical decomposed product and the monomer (a) in a solvent, each of the monomer (b) and the radical polymerization initiator or a mixed solution is added dropwise.
2) A method in which, to a solution obtained by dissolving a decomposed product or a radical decomposed product and the monomer (a) and the radical polymerization initiator in a solvent, the monomer (b) is added dropwise.
(b) Solvent
1) As specific examples of a solvent which solves the heat-decomposed product or the radical decomposed product and the monomers (a) and (b), an aromatic hydrocarbon such as benzene, toluene, xylene and mixed xylene; an aliphatic hydrocarbon such as hexane, heptane, octane and decane; an alicyclic hydrocarbon such as cyclohexane and methylcyclohexane; a carboxylic ester such as methyl acetate, ethyl acetate, propyl acetate and butyl acetate; a ketone such as acetone and methyl ethyl ketone; a cyclic ether such as tetrahydrofuran and tetrahydropyrane; and a halogenated hydrocarbon such as chlorobenzene.

As the single solvent, an aromatic hydrocarbon such as toluene and xylene; and a cyclic ether such as tetrahydrofuran.

As for the mixed solvent, it is required that the monomer (a), the monomer (b) and the heat decomposed product or the radical decomposed product be dissolved homogeneously, and the solvent type is appropriately selected. At this time, a suitable solvent is used after confirming in advance that each of the above-mentioned three components is dissolved in a mixed solvent of which the solvent type and the composition are the same.

Specifically, the mixed solvent is a mixed solvent selected from one or more selected from an aliphatic hydrocarbon and an alicyclic hydrocarbon and one or more selected from a carboxylic acid ester and a ketone. As more specific combinations, a combination of hexane/ethyl acetate, a combination of hexane/butyl acetate, a combination of hexane/methyl ethyl ketone and a combination in which hexane is substituted by heptane, decane, cyclohexane or methylcyclohexane can be given. It is preferred that the mixing composition be in the range of 25/75 to 75/25 mass %, more preferably in the range of 30/70 to 70/30 mass %, and further preferably in the range of 35/65 to 65/35 mass %. A content of one of the solvent types of less than 25 mass % or exceeding 75 mass % is not preferable since an unsoluble matter tends to be generated easily.

Also, a combination of solvents used in the single solvent system or a mixed solvent composed of a solvent used in the single solvent system and a carboxylic acid ester or a ketone. In this case, it is preferred that the mixing ratio be 30/70 to 70/30 mass %.

(B) In the Case of Melting Reaction

A graft copolymerization is conducted in the same manner as in the case of a reaction using a solvent, except that no solvent is used and a reaction is conducted in the state that the heat composed product or the radical composed product are in the molten state.

It is preferred that the monomer (a) be dissolved in the molten heat decomposed product or the molten radical decomposed product. Specifically, a case where the monomer (a) is an α-olefin or vinylsilane and substituted products thereof is preferable.

The graft copolymer of the invention comprises a polyolefin selected from a propylene homopolymer; a propylene-based copolymer comprising propylene, ethylene and one or more α-olefins each having 4 to 10 carbon atoms and containing ethylene and the α-olefins each having 4 to 10 carbon atoms in an amount of 10 mol % or less; a butene-1 homopolymer; and a butene-1-based copolymer comprising butene-1, ethylene, propylene and one or more α-olefins each having 5 to 10 carbon atoms and containing ethylene, propylene and the α-olefins each having 5 to 10 carbon atoms in an amount of 10 mol % or less, the polyolefin having, at both ends thereof, a polyolefin chain unit derived from one or more selected from the following [I], [II], [III] and [IV] or a polyolefin chain unit derived from one or more selected from the following Group A and one or more selected from the following Group B and the graft copolymer satisfying the following (c):

[I] acrylic acid and its derivatives;
[II] methacrylic acid and its derivatives;
[III] vinylesters and its derivatives or vinylalkoxysilane; and
[IV] styrene and its derivatives;

Group A:
[V] maleic anhydride and substituted maleic anhydride;
[VI] maleic acid and its esters;
[VII] maleimide and substituted maleimide;

Group B:
[I] acrylic acid and its derivatives;
[II] methacrylic acid and its derivatives;
[III] vinylester and its derivatives or vinylalkoxysilane;
[IV] styrene and its derivatives;
[VIII] α-olefin; and (c) the molecular weight distribution (Mw/Mn) is 1.6 to 6.

As for [I] to [VIII], the same as those mentioned above can be applied.

The grafting ratio of the graft copolymer is preferably 1 to 150 mass %, more preferably 2 to 130 mass % and further preferably 5 to 100 mass %.

If the grafting ratio is 1 mass % or more, the number of side chains is adequate, and as a result, functions such as compatibility, adhesiveness or the like can be fully exhibited. If the grafting ratio is 150 mass % or less, the amount of a reactive polyolefin component is adequate, whereby the function can be fully exhibited.

The above-mentioned grafting ratio can be measured by the following method, for example.

A monomer and a soluble polymer component which did not relate to the graft reaction is removed by dissolution by using a solvent, and the grafting ratio is calculated based on the amount (W2) of the unsoluble graft copolymer component and the amount (W1) of the reactive polyolefin used as a raw material according to the following formula:

$$\text{Grafting ratio (mass \%)} = (W2 - W1)/W1 \times 100$$

The method for obtaining the grafting ratio is not limited to the above-mentioned method, and can be determined by a normal method based on the NMR measurement of the unsoluble graft copolymer components.

It is preferred that the mesopentad fraction [mmmm] of the propylene chain or the butene-1 chain of the polyolefin chain of the graft copolymer be 20 to 80 mol %, more preferably 30 to 70 mol %.

The polyolefin used for producing the graft copolymer of the invention which is selected from a propylene homopolymer, a propylene-based copolymer, a butene-1 homopolmyer and a butene-1-based copolymer preferably have an atactic structure or a syndiotactic structure.

The graft copolymer of the invention has a limiting viscosity [η] measured at 135° C. of preferably 0.01 to 2.5 dl/g, more preferably 0.02 to 2.2, with 0.05 to 2.0 being further preferable.

If the limiting viscosity [η] is 0.01 dl/g or more, the function such as resin compatibilizability is improved. On the other hand, a limiting viscosity of 2.5 dl/g or less is preferable since dispersibility in a resin is improved.

The graft copolymer of the invention has a weight average molecular weight of normally 500 to 400,000, preferably 700 to 350,000, more preferably 1000 to 300,000, with 1500 to 250,000 being most preferable.

The molecular weight distribution (Mw/Mn) of the graft copolymer of the invention is 1.6 to 6, preferably 1.8 to 5, more preferably 1.8 to 4. Further, by using adequate reaction conditions, controlling the reactivity of unsaturated groups, controlling the number of terminal unsaturated groups per molecule or the like, occurrence of a side reaction other than the graft polymerization can be suppressed, and also, the molecular weight distribution can be lowered.

Further, evaluation of the weight average molecular weight and the molecular weight distribution of the graft copolymer can be conducted by the above-mentioned GPC method.

The graft copolymer of the invention preferably has a gel fraction of 5 mass % or less. It is more preferred that the graft copolymer contain no gel components.

The gel fraction can be evaluated by the following method, for example.

A solvent which solves both the main chain components and the side chain components of the graft copolymer is used. In a stainless-made basket formed of a 400-mesh net (sieve opening: 0.034 mm) in a glass-made separable flask provided with a stirrer, 50 mg of the graft copolymer is put, and fixed to the stirring blade.

A solvent containing 0.1 mass % of an antioxidant (BHT) is incorporated, and the graft copolymer is dissolved with stirring for 4 hours at a temperature which is equal to or lower than the boiling temperature. After dissolution, the collected basket was fully dried in vacuum, and the amount of an unsolved part is obtained by weighing.

The gel component (gel fraction) which is defined as the unsolved part is calculated by the following formula:

[Amount (g) remained in the mesh/Amount (g) of charged sample]×100 (unit: %)

As the solvent, paraxylene, toluene or the like can be given.

Normally, if the gel content is 0 to 1.5 mass %, it is defined that the copolymer does not contain gel components.

[Composition of the Invention and its Application]

The graft copolymer of the invention and a thermoplastic resin composition containing the graft copolymer and the polyolefin of the invention (hereinafter they may be comprehensively and simply referred to as the "composition of the invention") further contains a filler and/or a pigment.

The above-mentioned fillers include inorganic fillers and organic fillers.

As the inorganic filler, talc, white carbon, silica, mica, bentonite, an aluminum compound, a magnesium compound, a barium compound, diatomite, glass beads or glass fibers, metal powder or metal fibers or the like can be given.

As the organic filler, starch (powder starch, for example), fibrous leather (natural organic fibers composed of cellulose such as cotton and hemp, for example), fibers composed of a synthetic polymer such as nylon, polyester and polyolefin or the like can be given.

The above-mentioned pigments include inorganic pigments and organic pigments (azo-based pigments and polycylic pigments, for example).

Examples of the inorganic pigments include an oxide (titanium dioxide, zinc white (zinc oxide), iron oxide, chromium oxide, iron black, cobalt blue or the like, as hydroxides: alumina white, yellow iron oxide, viridian or the like), a sulfide (zinc sulfide, lithopone, cadmium yellow, vermilion, cadmium red or the like), chromate (chrome yellow, molybdate orange, zinc chromate, strontium chromate or the like), silicate (white carbon, clay, talc, ultramarine or the like) and sulfate (precipitating barium sulfate, baryta powder, as carbonate: calcium carbonate, white lead or the like). Other than these, ferrocyanides (Prussian blue), phosphate (manganese violet), carbon (carbon black) or the like can be used.

As the azo-based pigments as the organic pigment, soluble azo (Carmine 6B, Lake red C or the like), insoluble azo (Disazo yellow, Lake red 4R or the like), condensed azo (Chrome phthalo yellow 3G, Chromo phthalo scarlet RN or the like), an azo complex (nickel azo yellow or the like), benzimidazolone-azo (permanent orange HL or the like) or the like can be given. As the polycyclic pigment as the organic pigment, isoindolinone, isoindoline, quinophthalone, pyrazolone, flavanthrone, anthraquinone, diketopyrrolopyrrole, prrole, pyrazolone, pyranthrone, perynone, perylene, quinacridone, indigoid, oxazine, imidazolone, xanthene, carbonium, violanthrone, pthalocyanine, nitroso or the like can be given.

As for the content of the filler and/or the pigment, if the content of the filler and/or the pigment is taken as (a), and the content of the composition of the invention is taken as (b), (a)/(b)=0.005 to 20, for example, with 0.01 to 10 being preferable.

If the (a)/(b) is less than 0.05, improvement in wettability and adhesiveness of the surface of the filler or the pigment is insufficient, whereby, in a masterbatch or a resin dispersion composition, dispersibility and interfacial adhesion of the filler or the pigment may be insufficient. On the other hand, if the (a)/(b) exceeds 20, due to the presence of components of (b) which do not affect the surface treatment, leading to an increase in production cost.

The composition of the invention can be used preferably as an adhesive, a resin compatibilizing agent, a dispersion or a coating agent.

The composition of the invention can be used as a base for a hot melt adhesive. As other components of a hot melt adhesive, an additive such as oil, a tackifier, an anti-oxidant or the like is used in a normal amount range.

The composition of the invention can be used as a solvent-type adhesive after dissolving it in a solvent. The adhesive is coated on or sprayed to an adhesion substrate to form a coating on the surface thereof, whereby adhesion can be attained. Further, the composition of the invention can be used as an adhesive by dispersing it in a polar solvent such as water or by allowing it to be an emulsion. The composition of the invention is shaped in a sheet or a film, interposed between adhesion substrates, heated to over a temperature at which the adhesive fluids, followed by solidification by cooling, whereby adhesion can be attained.

The composition of the invention can be used as a resin compatibilizing agent by adding in an amount of 0.005 to 15 mass %, for example, relative to the resin composition comprising polyolefin as the essential components.

The composition of the invention can be a dispersion in which the graft polymer is finely dispersed by dissolving in a solvent at room temperature or by heating. The concentration of the graft copolymer is in the range of 5 to 30 mass %.

As the solvent, an aliphatic hydrocarbon compound such as hexane, heptane and decane; an aromatic hydrocarbon compound such as benzene, toluene and xylene; an alicyclic hydrocarbon compound such as cyclohexane and methylcyclohexane; a halogenated hydrocarbon such as chlorobenzene; and an ether compound such as tetrahydrofuran and tetrahydropyrane can be given.

By using a polar solvent as the solvent, the composition can be allowed to be an emulsion. As the polar solvent, water; an alcohol such as methanol, ethanol and butanol; and carboxylic esters such as methyl acetate, ethyl acetate and butyl acetate can be given.

As the method for producing a dispersion, the following method can be given, for example. A solution obtained by dissolving the composition in a solvent is added to the above-mentioned polar solvent with stirring to form solid fine particle components, and the solvent is distilled off, whereby a dispersion of a polar solvent is produced.

Specifically, a method in which a solution containing 20 to 30 mass % of tetrahydrofuran is gradually added to water of 20 to 50° C., and tetrahydrofuran is removed under reduced pressure, and the amount of water is adjusted such that a desired concentration is attained, or the like can be exemplified. As the other method, a known method in which the composition is directly dispersed in a polar solvent by high-speed stirring or at a high shear field or the like can be given. According to need, a surfactant such as an anionic, cationic or nonionic surfactant or a water-soluble polymer compound can be used as an additive.

The above-mentioned dispersion is applied to or sprayed to the surface of the substrate, followed by removal of a solvent, whereby coating can be attained. Further, a film or a sheet is put on a substrate, coating can be attained by heating and cooling. In addition to these methods, molten functional polyolefin and the graft copolymer of the invention is uniformly applied on the substrate, whereby coating can be attained by solidification by cooling.

The functional polyolefin of the invention can be used as an adhesive, a resin compatibilizing agent, a dispersion and a coating material as mentioned above. In addition, it can also be used as a reactive hot melt adhesive, a sealing agent and a potting agent.

The reactive hot melt adhesive is composed mainly of a functional polyolefin containing alkoxy silicon and the graft copolymer of the invention, and, according to need, contains oil and a tackifier, an inorganic filler and a silanol condensed catalyst.

As the above-mentioned oil, naphthene-based oil, paraffin-based oil and aroma-based oil or a mixture of these oil, and liquid rubber such as liquid polybutene and liquid isopolybutylene can be given. They may be used singly or in combination of two or more.

As the tackifier (tackifying resin), one which has good compatibility with functional polyolefin is selected from various commonly used tackifiers such as rosin and its derivatives, a terpene-based resin and its hydrogenated resin, a styrene-based resin, a cumaron-indene resin, dicyclopentadiene (DCPD)-based resin and its hydrogenated resin, an aliphatic (C5) petroleum resin and its hydrogenated resin, aromatic (C9) petroleum resin and its hydrogenated resin and a C5-C9-based copolymer petroleum resin and its hydrogenated resin. These tackifiers may be used singly or in combination of two or more.

As the preferable tackifying resin, in respect of well-balanced removability and adhesion to a curved surface and a corrugated surface, it is preferable to use one or a combination of two or more selected from a terpene-based resin and its hydrogenated resin, a styrene-based resin, a dicyclopentadiene (DCPD)-based resin and its hydrogenated resin, an aliphatic (C5) petroleum resin and its hydrogenated resin, an aromatic (C9) petroleum resin and its hydrogenated resin and a C5-C9-based copolymer petroleum resin and its hydrogenated resin.

As the inorganic filler, silica, alumina, zinc oxide, titanium oxide, calcium oxide, magnesium oxide, iron oxide, tin oxide, antimony oxide, ferrites, calcium hydroxide, magnesium hydroxide, aluminum hydroxide, basic magnesium carbonate, calcium carbonate, zinc carbonate, barium carbonate, dawsonite, hydrotalcite, calcium sulfate, barium sulfate, calcium silicate, talc, clay, mica, montmorillonite, bentonite, sepiolite, imogolite, sericite, glass fibers, glass beads, silica-based baloon, aluminum nitride, boron nitride, silicon nitride, carbon black, graphite, carbon fibers, carbon balloon, zinc borate and various magnetic powder or the like can be given.

Instead of an inorganic filler, an inorganic filling agent or the like can be used. A surface treatment may be conducted by using various coupling agents such as a silane-based coupling agent or a titanate-based coupling agent. As for the treatment, a method in which an inorganic filling agent is directly treated by means of various coupling agents, such as a dry method, a slurry method or a spray method, or an integral blend method such as a direct method and a masterbatch method, or a dry concentrate method or the like can be given.

It is better to use the silanol condensed catalysts in a mixed form. As for the adding method, it is preferred that a catalyst masterbatch in which a silanol condensed catalyst is included at a high concentration is prepared in advance, and the masterbatch and other reactive hot melt components are blended, followed by kneading and melting.

As examples of the silanol condensed catalyst, organic tin metal compounds such as dibutyltin dilaurate, dibutyltin diacetate and dibutyltin dioctate; an organic acid such as an organic base and ethylamine acid, and aliphatic acid or the like can be given. Of these, dibutyltin dilaurate, dibutyltin diacetate and dibutyltin dioctate are preferable. They are added in an amount of 0.005 to 2.0 mass %, preferably 0.01 to 0.5 mass %, relative to the α-olefin polymer modified product.

As the method for curing a reactive hot melt adhesive, a method in which a reactive hot melt adhesive is allowed to contact with water or moisture in the presence or in the absence of a silanol condensed catalyst, followed by a heat treatment or a curing at room temperature.

In order to allow a hot melt adhesive to contact with water or moisture, a reactive hot melt adhesive may be allowed to stand in the air or may be immersed in a water tank while introducing steam. Although the temperature may be normal temperature, a high temperature is preferable since cross-linking is conducted for a short period of time.

The functional polyolefin can be used as a sealing agent or a potting agent. If cross linking properties are required, it can be prepared in the same method as in the case of the above-mentioned hot melt adhesive.

If cross linking properties are not required, a molten product composed mainly of a functional polyolefin and the graft copolymer of the invention is used for sealing or potting, and immobilized by solidification by cooling.

EXAMPLES

Production Example 1

Production of Low Crystalline Polypropylene

In a stainless-made reactor having an internal volume of 20 L provided with a stirrer, 24 Uh of n-heptane, 15 mmol/h of triisobutylaluminum and a catalyst component obtained by allowing dimethylanilinium tetrakispentafluorophenylborate, (1,2'-dimethylsilylene)(2,1'-dimethylsilylene)-bis(3-trimethylsilylmethylindenyl) zirconium dichloride and triisobutyl aluminum to contact with each other at a mass ratio of 1:2:20 are supplied continuously at a rate of 6 μmol/h in terms of zirconium.

The polymerization temperature is set at 83° C., and propylene and hydrogen were continuously supplied such that the hydrogen concentration of the gas phase part of the reactor was kept at 0.86 mol % and the total pressure within the reactor was kept at 0.7 MPa·G, whereby a polymerization reaction was conducted.

To the resulting polymerization solution, Irganox 1010 (Chiba Speciality Chemicals Corporation) was added such that the content thereof became 500 mass ppm. N-heptane as the solvent was removed, whereby low crystalline polypropylene was obtained. This low crystalline polypropylene was allowed to be resin pellets by underwater cutting.

The tacticity [mmmm] of the resulting low crystalline polyolefin was 45 mol %, the weight average molecular weight (Mw) was 45,600 and the number of terminal unsaturated groups (here, the number of terminal vinylidene groups) was 0.95/molecule.

Production Example 2

Production of Low Crystalline Polypropylene

Resin pellets of low crystalline polypropylene were obtained in the same manner as in Production Example 1, except that, in the polymerization reaction of Production Example 1, propylene and hydrogen were supplied such that the polymerization temperature was set at 67° C., the hydrogen concentration of the gas phase part of the reactor was 0.74 mol % and the total pressure of the reactor was kept at 0.75 MPa·G.

The tacticity [mmmm] of the resulting low crystalline polyolefin was 46 mol %, the weight average molecular weight (Mw) was 129,000 and the number of terminally unsaturated groups (the number of terminal vinylidene groups) was 0.97/molecule.

Production Example 3

Production of Low Crystalline Polypropylene

In a stainless-made reactor having an internal volume of 20 L provided with a stirrer, 12 Uh of n-heptane, 15 mmol/h of triisobutylaluminum and a catalyst component obtained by allowing dimethylanilinium tetrakispentafulorophenylborate, (1,2'-dimethylsilylene)(2,1'-dimethylsilylene)-(3-trimethylsilylmethylindenyl)(indenyl)zirconium dichloride and triisobutyl aluminum to contact with each other at a mass ratio of 1:2:20 were supplied continuously at a rate of 24 μmol/h in terms of zirconium.

The polymerization temperature was set at 70° C., and propylene and hydrogen were continuously supplied such that the hydrogen concentration of the gas phase part of the reactor was kept at 0.23 mol % and the total pressure within the reactor was kept at 0.46 MPa·G, whereby a polymerization reaction was conducted.

To the resulting polymerization solution, Irganox 1010 (Chiba Speciality Chemicals Corporation) was added such that the amount ratio thereof became 500 mass ppm N-heptane as the solvent was removed, whereby low crystalline polypropylene was obtained. This low crystalline polypropylene was allowed to be resin pellets by underwater cutting.

The tacticity [mmmm] of the resulting low crystalline polyolefin was 59 mol %, the weight average molecular weight (Mw) was 45000 and the number of terminally unsaturated groups (the number of terminal vinylidene groups) was 0.96/molecule.

Example 1

Production of Highly Terminally Unsaturated Polypropylene and its Radical Decomposition As the raw material polyolefin, polypropylene in Production Example 1 was used, and radically decomposed polypropylene was produced under the conditions shown in Table 1.

Specifically, 40 g of polypropylene produced in Production Example 1 was incorporated in a stainless-made reactor provided with a stirrer (internal volume: 500 mL). The resultant was stirred under the nitrogen stream for 30 minutes.

Stirring was stopped, and the resin temperature was increased to 120° C. by means of a mantle heater. After confirming that the resin was molten, the stirring was started again. The mantle heater was controlled such that the resin temperature was fixed at 270° C. To this molten resin, 0.4 ml (0.36 g) of cumene hydroperoxide (product name: Percumyl H, manufactured by NOF Corporation) was added dropwise for 4 minutes. After the completion of the dropwise addition, the reaction was conducted foe 4 minutes, and the resultant was cooles to 110° C. by air cooling. 200 ml of toluene was added while keeping the temperature at 110° C., whereby a homogenous solution was prepared.

This toluene solution was collected in a vat coated with Teflon (registered trademark), and the toluene was removed, followed by drying under reduced pressure at 100° C. for 8 hours, whereby radically decomposed polypropylene was obtained.

For the resulting radically decomposed polypropylene, the weight-average molecular weight Mw, the number-average molecular weight Mn, the molecular weight distribution Mw/Mn, the content of the vinylidene groups and the number per molecule of the terminal vinylidene groups were evaluated, and the results are shown in Table 2.

In Example 1, the generation ratio of a bi-product (the amount of generated bi-product [g]/the amount of raw materials [g]) was 0.01135.

Examples 2 to 9

Radically decomposed polypropylene was produced and evaluated in the same manner as in Example 1, except for the production conditions were changed to those shown in Table 1. The results are shown in Table 2. In Examples 5, 6 and 7, the organic peroxide was divided into two portions and added separately. This addition was conducted as follows. The first portion of the organic peroxide was added and reacted for the same addition time and the reaction time as those in Example 1. Thereafter, the second portion of the organic peroxide was added and reacted for the same addition time and the reaction time as those in Example 1.

In Example 2, the generation ratio of a bi-product (the amount of generated bi-product [g]/the amount of raw materials [g]) was 0.00304. The generation ratio of a bi-product in Example 4 was 0.00844.

The product name of tertiary butyl cumyl peroxide in Examples 3 and 5 to 7 Perbutyl C (manufactured by NOF Corporation), and the product name of diisopropyl benzene hydroperoxide in Example 8 was Percumyl P (manufactured by NOF Corporation).

TABLE 1

| | Raw material polyolefin | Charged amount [g] | Decomp,* Temp. [° C.] | Organic peroxide | Frequency of adding organic peroxide | Added amount [g] | Addition time [min] | Reaction time [min] |
|---|---|---|---|---|---|---|---|---|
| Example 1 | Production Example 1 | 40 | 270 | Cumene hydroperoxide | Once | 0.36 | 4 | 4 |
| Example 2 | Production Example 1 | 40 | 250 | Cumene hydroperoxide | Once | 0.36 | 4 | 4 |
| Example 3 | Production Example 1 | 40 | 230 | Tertiary butyl cumyl | Once | 0.36 | 2 | 10 |

TABLE 1-continued

|  | Raw material polyolefin | Charged amount [g] | Decomp,* Temp. [°C.] | Organic peroxide | Frequency of adding organic peroxide | | Added amount [g] | Addition time [min] | Reaction time [min] |
|---|---|---|---|---|---|---|---|---|---|
| Example 4 | Production Example 2 | 40 | 270 | Cumene hydroperoxide | Once | | 0.36 | 4 | 4 |
| Example 5 | Production Example 1/ Production Example 2 = 50/50 [wt %] | 40 | 230 | Tertiary butyl cumyl peroxide | Twice | First Second | 0.18 0.18 | 2 2 | 5 5 |
| Example 6 | Production Example 1 | 40 | 230 | Tertiary butyl cumyl peroxide | Twice | First Second | 0.18 0.18 | 2 2 | 5 5 |
| Example 7 | Production Example 2 | 50 | 260 | Tertiary butyl cumyl peroxide | Twice | First Second | 0.18 0.18 | 4 4 | 6 6 |
| Example 8 | Production Example 2 | 60 | 260 | Diisopropylbenzene hydroperoxide | Once | | 0.48 | 20 | 2 |
| Example 9 | Production Example 3 | 40 | 230 | Tertiary butyl cumyl peroxide | Once | | 0.36 | 6.5 | 1 |

Decomp, Temp * Decomposition temperature [°C.]

TABLE 2

| | Decomposed polypropylene | | | | | | |
|---|---|---|---|---|---|---|---|
| | Mw | Mn | Mw/Mn | Content of vinylidne group [mol %] | Number of terminal vinylidene [/molecule] | [mmmm] [mol %] | Mp/Mm |
| Example 1 | 17500 | 10900 | 1.6 | 0.74 | 1.92 | 45 | 0.38 |
| Example 2 | 21500 | 12600 | 1.7 | 0.54 | 1.62 | 45 | 0.47 |
| Example 3 | 32500 | 16200 | 2.0 | 0.40 | 1.54 | 44 | 0.71 |
| Example 4 | 33500 | 22300 | 1.5 | 0.37 | 1.96 | 45 | 0.26 |
| Example 5 | 37500 | 16400 | 2.3 | 0.40 | 1.56 | 45 | 0.43 |
| Example 6 | 32000 | 14400 | 2.2 | 0.40 | 1.37 | 44 | 0.70 |
| Example 7 | 24000 | 16100 | 1.5 | 0.52 | 1.98 | 45 | 0.19 |
| Example 8 | 39700 | 24800 | 1.6 | 0.31 | 1.81 | 46 | 0.31 |
| Example 9 | 29200 | 16200 | 1.8 | 0.40 | 1.60 | 57 | 0.65 |

Comparative Example 1

Production of Terminally Unsaturated Polypropylene from High-Molecular Polypropylene Radically decomposed polypropylene was produced and evaluated in the same manner as in Example 1, except that commercially available polypropylene J300SP (Prime Polymer Co., Ltd) was used as the raw material polyolefin.

Since the melt viscosity of J300SP (tacticity [mmmm]=96 mol %, weight-average molecular weight (Mw)=440000) at 190° C. greatly exceeded 2000 Pas. Therefore, stirring was difficult, and great stirring power was required. As a result, stirring and mixing of the organic peroxide could not be conducted sufficiently, and the organic peroxide remained in the form of a droplet on the surface of the molten propylene for a long period of time.

The weight average molecular weight of the resulting decomposed polypropylene was 371000 and the number of terminal unsaturated groups (the number of terminal vinylidene groups) was 0.08/molecule. The tacticity [mmmm] was 96%.

Comparative Example 2

Production of Terminally Unsaturated Polypropylene Using Polypropylene Having a Relatively Low Molecular Weight Radically decomposed polypropylene was produced and evaluated in the same manner as in Example 1, except that commercially available polypropylene J3000GV (Prime Polymer Co., Ltd) (tacticity [mmmm]=97 mol %, weight-average molecular weight (Mw)=230000) was used as the raw material polyolefin.

The melt viscosity of J3000GV at 190° C. exceeded 2000 Pas, but stirring was possible.

The weight-average molecular weight of the resulting decomposed polypropylene was 155000, and the number of terminal unsaturated groups (the number of terminal vinylidene groups) was 0.12/molecule. Further, the tacticity [mmmm] was 96 mol %.

In order to produce polypropylene having a large number of terminal unsaturated groups, it is required to use polypropylene having a high molecular weight. A high-molecular polypropylene had an extremely high melt viscosity, and stirring is difficult by a normal tank-type reactor. From the results of Comparative Examples 1 and 2, it can be understood that desired decomposed polypropylene could not be produced due to insufficient stirring of the peroxide or the like. If production is possible, the production is limited to a small-amount production for which the restrictions imposed on the stirring power is small, whereby the production cost becomes high.

On the other hand, from the results of Comparative Examples 1 and 2, it can be understood that if low-molecular weight polypropylene is used as the raw material, problems associated with stirring can be avoided. However, the production of propylene having a high degree of unsaturation has its limit.

Example 10

Production of Highly Terminally Unsaturated Polypropylene

Continuous Production of Radically Decomposed Polypropylene by Means of a Melt Extruder (1) Production of a Composition Composed of Polypropylene and an Organic Peroxide A composition formed of raw material polypropylene and an organic peroxide was produced under the conditions shown in Table 3. Specifically, 1000 g of polypropylene obtained in Production Example 2 was incorporated into a universal stirrer (model: 5DM-L-03-rr, Dalton mixer), and stirred at 126 rpm under the stream of nitrogen for 30 minutes. The nitrogen stream was stopped. While keeping the nitrogen atmosphere state, a homogenous solution of 20 mL of hexane and 4.3 g of diisopropylbenzene hydroperoxide (product name: Percumyl P, manufactured by NOF Corporation) was added dropwise for 20 minutes with stirring. After the dropwise addition, stirring was conducted for 20 minutes.

After completion of the stirring, pellets were visually observed. The pellets were in the dry state. It was confirmed that the organic peroxide was uniformly absorbed.

(2) Radical Decomposition by Melt Extrusion

By using a twinlab blast mill manufactured by Toyo Seiki Kogyo Co., Ltd (20 mm$\phi$, L/D=27), extrusion was conducted under the following conditions (barrel temperature: 230° C., dice temperature: 200° C., number of revolutions: 100 rpm and discharge amount: 2800 g/h). The discharged product was air-cooled to produce solid-like decomposed polypropylene. Contamination and adhesion of the hopper part and the constant feeder were visually confirmed. The results obtained are shown in Table 4.

The resulting decomposed polypropylene was evaluated in the same manner as in Example 1. The results are shown in Table 5.

Examples 11 and 12

Decomposed polypropylene was produced and evaluated in the same manner as in Example 10, except for the radical decomposition by melt extrusion was conducted under the conditions shown in Table 4. The results are shown in Table 5.

Comparative Example 3

Decomposed polypropylene was produced and evaluated in the same manner as in Example 10, except that the melt radical decomposition extrusion was conducted under the conditions shown in Table 4 using a composition composed of the polypropylene produced under the conditions shown in Table 3 and an organic peroxide. The results are shown in Table 5.

As compared with the decomposed polypropylene of Examples 10 to 12, the decomposed polypropylene of Comparative Example 3 had an offensive odor.

Referential Examples 1 to 3

A composition composed of the polypropylene produced under the conditions shown in Table 3 and an organic peroxide was evaluated in the same manner as in Example 10. The results are shown in Table 3.

TABLE 3

| | Raw material propylene | | Dispersant aid | | Organic peroxide | | |
|---|---|---|---|---|---|---|---|
| | Kind | Amount used [g] | Kind | Amount used [ml] | Kind | Amount used [g] | Dispersed state |
| Example 10 | Production Ex. 2 | 1000 | Hexane | 20 | Diisopropyl benzene hydroperoxide | 4.3 | No liquid parts, good fluidity in uniformly dispersed pellets |
| Ref. Ex. 1 | Production Ex. 2 | 1000 | Heptane | 20 | Diisopropyl benzene hydroperoxide | 4.3 | No liquid parts, good fluidity in uniformly dispersed pellets |
| Ref. Ex. 2 | Production Ex. 2 | 1000 | Decane | 40 | Cumene hydroperoxide | 4.3 | No liquid parts, good fluidity in uniformly dispersed pellets |
| Ref. Ex. 3 | Production Ex. 2 | 1000 | Butyl acetate | 20 | Diisopropyl benzene hydroperoxide | 4.3 | No liquid parts, good fluidity in uniformly dispersed pellets |
| Com. Ex. 3 | J3000GV | 1000 | Hexane | 20 | Diisopropyl benzene hydroperoxide | 4.3 | Liquid parts remained, wetting of pellet surface and adhesion to the stirrer |

TABLE 4

| | Decomposed composition | Barrel temperature [° C.] | Dice tempeature [° C.] | Number of revolutions [rpm] | Discharge amout [g/hour] | Hopper part | Constant feederpart |
|---|---|---|---|---|---|---|---|
| Example 10 | Example 10 | 230 | 200 | 100 | 2800 | No contamination or adhesion | No contamination or adhesion |
| Example 11 | Example 10 | 260 | 200 | 100 | 2600 | No contamination or adhesion | No contamination or adhesion |
| Example 12 | Example 10 | 260 | 200 | 120 | 2500 | No contamination or adhesion | No contamination or adhesion |
| Com. Ex. 3 | Com. Ex. 3 | 230 | 200 | 100 | 3600 | Wetting, partiary adhesion | Wetting |

TABLE 5

| | Mw | Mw/Mn | Radically decomposed polypropylene Content of vinylidene group [mol %] | Number of terminal vinylidene groups [/molecule] | [mmmm] [mol %] | Mp/Mm |
|---|---|---|---|---|---|---|
| Example 10 | 95700 | 1.80 | 0.11 | 1.35 | 45 | 0.74 |
| Example 11 | 79600 | 1.89 | 0.17 | 1.73 | 45 | 0.62 |
| Example 12 | 70800 | 1.89 | 0.20 | 1.78 | 45 | 0.55 |
| Com. Ex. 3 | 128400 | 3.80 | 0.02 | 0.16 | 96 | 0.55 |

From the results shown in Tables 3 to 5, it can be understood that, according to the tacticity and the molecular weight of the raw material propylene, disadvantages occur that impregnation of radicals is difficult in the melt extrusion reaction.

Example 13

Production of Highly Terminally Unsaturated Polypropylene by Heat Decomposition

By using the polypropylene of Production Example 1 as the raw material polyolefin, heat-decomposed polypropylene was produced under the conditions shown in Table 6.

TABLE 6

| | Decomposition conditions | |
|---|---|---|
| | Temperature [° C.] | Time [min] |
| Example 13 | 320 | 240 |
| Example 14 | 360 | 120 |
| Example 15 | 380 | 120 |

TABLE 7

| | Decomposed polypropylene | | | | | |
|---|---|---|---|---|---|---|
| | Amount of generated bi-product [bi-product (g)/charged raw material (g)] | Mw | Mw/Mn | Mp/Mm | Content of vinylidene groups [mol %] | Number of terminal vinylidene groups [/molecule] |
| Example 13 | 0.0130 | 21100 | 2.18 | 0.463 | 0.6 | 1.38 |
| Example 14 | 0.0580 | 8190 | 1.58 | 0.180 | 2.2 | 1.79 |
| Example 15 | 0.4640 | 3610 | 1.53 | 0.079 | 3.4 | 1.92 |

Specifically, 100 g of polypropylene which was produced in Production Example 1 was incorporated in a stainless-made reactor provided with a stirrer (internal volume: 500 mL). Under the stream of nitrogen, the resultant was stirred for 30 minutes.

Stirring was stopped, and the resin temperature was increased to 150° C. by means of a mantle heater. After confirming that the resin became in the molten state, the stirring was started again. The mantle heater was controlled such that the resin temperature was fixed at 320° C., and heat decomposition was conducted for 240 minutes. After the completion of the reaction, the resin was cooled to 100° C., and 200 mL of toluene was incorporated to prepare a homogeneous solution.

This toluene solution was collected in a vat coated with Teflon (registered trademark), and toluene was removed, followed by drying under reduced pressure at 100° C. for 8 hours, whereby radically decomposed polypropylene was obtained. The resulting heat decomposed polypropylene was evaluated in the same manner as in Example 1. The results obtained are shown in Table 7.

Examples 14 and 15

The decomposed polypropylene was produced and evaluated in the same manner as in Example 13, except that the heat decomposition was conducted under the conditions shown in Table 6. The results are shown in Table 7.

Comparative Example 4

An attempt was made to produce heat-decomposed polypropylene in the same manner as in Example 13, except that commercially available polypropylene J300SP (Prime Polymer Co., Ltd) was used as the raw material polyolefin. J300SP was difficult to be stirred homogenously at 320° C. due to its high viscosity. As a result, the temperature of the molten resin could not be controlled at a predetermined temperature, whereby it was impossible to produce heat-decomposed polypropylene.

From the results of Comparative Example 4, it can be understood that, while a larger molecular weight of polypropylene is preferable in order to produce polypropylene having a large number of terminal unsaturated groups, since the polymer has a high melt viscosity, it is difficult to control the temperature within the reaction system at a fixed level. That is, the molten body has a low heat conductivity, and strong stirring is required in order to keep the temperature in the reaction system constant. As a result, complicated countermeasures such as large stirring power and an effective stirring method or the like are required. Therefore, the production amount per chamber is restricted to a small amount, whereby large-scale production is impossible.

On the other hand, in Examples 13 to 15, when one having a terminal unsaturated group in advance is used as the raw material polypropylene, unsaturated polypropylene having a larger number of terminal unsaturated groups can be produced by using low-molecular polypropylene, thereby leading to easiness. As a result, in stirring, it is possible to produce efficiently polypropylene having a large number of terminal unsaturated groups without the restrictions imposed on the production scale.

Example 16

Production of a Copolymer with a Polar Monomer (1) Production of Radically Decomposed Low Tactic Polypropylene Radically decomposed low tactic polypropylene was produced in the same manner as in Example 8, except that the reaction scale was multiplied by 5 times. The resulting polypropylene was collected in the molten state at a temperature of 140° C. After solidifying by cooling, the resin was cut in advance into a plate-like shape having a size of about 5×5×1 cm. The thus obtained plate-like resin was cooled on a dry ice ethanol bath, pulverized by means of a pulverizer, thereby to obtain pulverized pellets. After drying with air, the pellet was dried for 8 hours in a vacuum dryer of 40° C.

(2) Production of a radically decomposed low tactic polypropylene/2-ethylhexyl acrylate/3-(triethoxysilyl) propyl=methacrylate copolymer By using the radically decomposed polypropylene produced in (1), a graft copolymer was produced under the conditions shown in Table 8.

Specifically, a 200 mL-reactor provided with a stirrer was fully replaced with nitrogen. Then, 30 g of pulverized pellets of the polypropylene produced in (1) was incorporated, followed by stirring in the nitrogen stream for 10 minutes. The pellets were molten at a temperature of 140° C. To the resultant, a mixed solution of 7.7 ml (6.70 g) of 2-ethylhexyl acrylate, 1.1 mL (1.15 g) of 3-(triethoxysilyl) propyl=methacrylate and 0.2 mL (0.18 g) of tertiary butyl cumyl peroxide (Perbutyl C, manufactured by NOF Corporation) was added with stirring over a period of 30 minutes. After the completion of the addition, the reaction was conducted for further 10 minutes. The resultant was kept for 20 minutes under a reduced pressure while keeping the temperature at 140° C. The resulting copolymer was collected under the nitrogen atmosphere and kept under the nitrogen atmosphere.

The resulting copolymer was evaluated in the same manner as in Example 1. As a result, it was found that the reaction ratio of the terminal unsaturated group was 42%, showing that the graft copolymerization reaction proceeded. The copolymer was extracted under the following conditions. As a result of the NMR measurement, polypropylene components were detected in the soluble part. It was apparent that, at the time of copolymerization of 2-ethylhexyl acrylate and 3-(triethoxysilyl)propyl=methacrylate, low tactic polypropylene macromonomers were co-polymerized. The results obtained are shown in Table 9.

[Extraction Conditions]
Solvent: acetone: 100 mL
Sample: 5 g
Temperature: 30° C.
Extraction time: 8 hours
[Solid-Liquid Separating Method]

After separating by allowing it to stand, a supernatant was filtered. After concentrating the filtrate, polymer in a soluble part was collected by drying. The NMR measurement of the polymer in a soluble part was conducted.

Examples 17 to 21

Production of a Copolymer with a Polar Monomer

A graft copolymer was produced and evaluated in the same manner as in Example 16, except that the production of the copolymer was conducted under the conditions shown in Table 8. The results are shown in Table 9.

The product name of 1,1-di(tert-hexylproxy)cyclohexane is Perhexa HC (manufactured by NOF Corporation).

TABLE 8

| | Unsaturated low tactic polypropylene | | Copolymerization monomer (1) | | Copolymerization monomer (2) | | Copolymerization monomer (3) |
|---|---|---|---|---|---|---|---|
| | Kind | Charged amount [g] | Kind | Charged amount [ml] | Kind | Charged amount [ml] | Kind |
| Example 16 | Example 8 | 30 | 2-Ethylhexyl acrylate | 7.7 | 3-(Triethoxysilyl) propyl = methacrylate | 1.1 | — |
| Example 17 | Example 8 | 30 | 2-Ethylhexyl acrylate | 7.7 | 3-(Triethoxysilyl) propyl = methacrylate | 1.1 | — |
| Example 18 | Example 8 | 30 | 2-Ethylhexyl acrylate | 7.5 | Acrylic acid | 2.2 | — |
| Example 19 | Example 8 | 30 | 2-Ethylhexyl acrylate | 8.5 | Acrylic acid | 2.2 | Maleic anhydride |
| Example 20 | Example 8 | 30 | Butyl acrylate | 15 | Glycidyl methacrylate | 1.5 | — |
| Example 21 | Example 4 | 35 | Butyl acrylate | 15 | Glycidyl methacrylate | 1.5 | — |

| | Copolymerization monomer (3) | Organic peroxide | | | Dropwise | |
|---|---|---|---|---|---|---|
| | Charged amount [g] | Kind | Charged amount [ml] | Temperature [° C.] | addition time [min] | Reaction time [min] |
| Example 16 | — | Tert-butyl cumyl peroxide | 0.2 | 140 | 30 | 10 |
| Example 17 | — | Tert-butyl cumyl peroxide | 0.2 | 140 | 30 | 10 |
| Example 18 | — | Tert-butyl cumyl peroxide | 0.2 | 140 | 10 | 10 |
| Example 19 | 1.5 | 1,1-di(tert-hexylproxy) cyclohexane | 0.25 | 120 | 10 | 150 |

TABLE 8-continued

| | | | | | | |
|---|---|---|---|---|---|---|
| Example 20 | — | 1,1-di(tert-hexylproxy) cyclohexane | 0.25 | 120 | 30 | 150 |
| Example 21 | — | 1,1-di(tert-hexylproxy) cyclohexane | 0.25 | 130 | 30 | 120 |

TABLE 9

| | Conversion ratio of copolymerization mononer [%] | Polyproplene (PP) in solvent-soluble part | | Reation ratio of unsaturated groups [%] | Mw | Mw/Mn |
|---|---|---|---|---|---|---|
| | | Solvent for extraction | Presence of PP | | | |
| Example 16 | 99< | Acetone | Present | 42 | 45600 | 1.80 |
| Example 17 | 99< | Acetone | Present | 43 | 45000 | 1.75 |
| Example 18 | 99< | Acetone | Present | 65 | 47000 | 1.90 |
| Example 19 | 99< | Acetone | Present | 72 | 47500 | 2.10 |
| Example 20 | 99< | Acetone | Present | 35 | 46000 | 2.10 |
| Example 21 | 98.5 | Acetone | Present | 32 | 44300 | 2.00 |

Example 22

Production of a Copolymer with a Polar Monomer

A graft copolymer was produced under the conditions shown in Table 10 by using the radically decomposed polypropylene produced in Example 16(1) (polypropylene of Example 8 of which the reaction scale was multiplied by 5 times).

Specifically, a 200 mL-reactor provided with a stirrer was fully replaced with nitrogen. Then, 30 g of polypropylene produced in Example 16(1), 1.0 g of maleic anhydride and 100 mL of dehydrate toluene were incorporated, and stirring was started. At this time, dissolution with stirring was conducted with nitrogen bubbling. After the dissolution, nitrogen bubbling was stopped, and while keeping the nitrogen atmosphere, the temperature was fixed at 110° C. To this solution, dropwise addition of 0.25 g of AIBN (azobisisobutylnitrile) dissolved in 10 mL of dehydrated toluene and 5 mL of acrylic acid were simultaneously started from the separate ports. The dropwise addition time was 150 minutes for AIBN and 120 minutes for acrylic acid. After the dropwise addition of AIBN, the reaction was conducted for 60 minutes. After the completion of the reaction, 200 mL of toluene was added for dilution. The resultant was collected, and the solvent was removed and dried to obtain a copolymer.

The resulting copolymer was evaluated in the same manner as in Example 1. The results are shown in Table 11.

Examples 23 to 26

Production of a Copolymer with a Polar Monomer

A graft copolymer was produced and evaluated in the same manner as in Example 22, except that the copolymer was produced under the conditions shown in Table 10. The results obtained are shown in Table 11.

TABLE 10

| | Unsaturated low tactic polypropylene | | Copolymerization mononer (1) | | Copolymerization monomer (2) | | Coplymerization monomer (3) | |
|---|---|---|---|---|---|---|---|---|
| | Kind | Charged amount [g] | Kind | Charged amount [ml] | Kind | Charged amount [g] | Kind | Charged amount [ml] |
| Example 22 | Example 8 | 30 | Acrylic acid | 5 | Maleic anhydride | 1 | — | — |
| Example 23 | Example 8 | 30 | Styrene | 5 | Maleic anhydride | 1 | — | — |
| Example 24 | Example 8 | 30 | Vinyl acetate | 5 | Maleic anhydride | 1 | — | — |
| Example 25 | Example 8 | 30 | Acrylic acid | 5 | Maleic anhydride | 1.5 | Butyl acetate | 4 |
| Example 26 | Example 7 | 35 | Decene-1 | 5 | Maleic anhydride | 1 | — | — |

| | Radical polymerization initiator | | Solvent | | Temperature [° C.] | Dropwise addition time of radical polymerization initiator [min] | Dropwise addition time of Copoly-merization monomer [min] | Reaction time* [min] |
|---|---|---|---|---|---|---|---|---|
| | Kind | Charged amount [g] | Kind | Amount used [ml] | | | | |
| Example 22 | AIBN | 0.25 | Toluene | 100 | 110 | 150 | 120 | 60 |
| Example 23 | AIBN | 0.25 | Toluene | 100 | 110 | 150 | 120 | 60 |
| Example 24 | AIBN | 0.25 | Toluene | 100 | 110 | 150 | 120 | 60 |

TABLE 10-continued

| | | | | | | | | |
|---|---|---|---|---|---|---|---|---|
| Example 25 | AIBN | 0.25 | Hepthane/Ethyl acetate = 50/50 wt % | 120 | 86 | 150 | 120 | 120 |
| Example 26 | BPO | 0.45 | Toluene | 100 | 110 | 80 | 60 | 120 |

*"Reaction time" is a period of time lapsed after completion of the dropwise addition of a radical polymerization initiator.

TABLE 11

| | Conversion ratio of copolymerization monomer [%] | Polypropylene in solvent-soluble part (PP) | | Reaction ratio of unsaturated group [%] | Mw | Mw/Mn |
|---|---|---|---|---|---|---|
| | | Kind of solvent for extraction | Prsence of PP | | | |
| Example 22 | 99< | Methanol | Present | 87 | 47000 | 2.5 |
| Example 23 | 99< | Ethyl acetate | Present | 80 | 46500 | 3.1 |
| Example 24 | 99< | Ethyl acetate | Present | 85 | 44500 | 2.8 |
| Example 25 | 99< | Acetone | Present | 80 | 43500 | 2.1 |
| Example 26 | 99< | Methanol | Present | 72 | 31000 | 2.3 |

Example 27

Production of a Cured Product 20 g of the copolymer in Example 16 was dissolved by heating at 140° C. About 40 mg of dibutyltin dilaurate was added, and stirring was conducted until the resulting mixture became homogenous. The composition was shaped into a 1 mm-thick sheet by means of a hot press. The sheet was allowed to stand at a temperature of 23° C. and a humidity of 50% for 168 hours, whereby a cured product was produced.

The resulting cured product was heated for 10 minutes on a hot plate of which the temperature was controlled at 120° C., and a change in morphology was observed. The shape remained unchanged. The results are shown in Table 12. The cured product obtained on the hot plate showed elasticity. After elongation, it returned to the original shape by opening.

Example 28

Production of a Cured Product

A cured product was produced and evaluated in the same manner as in Example 27, except that the copolymer of Example 17 was used instead of the copolymer of Example 16. The results are shown in Table 12.

Example 29

Production of a Cured Product 5 g of the copolymer in Example 17 was dissolved in 50 mL of hexane in the atmosphere of nitrogen, and it was confirmed that the copolymer was dissolved homogeneously. To the resultant, 10 mg of dibutyltin dilaurate was added, and the resultant was stirred until it became homogeneous. The resulting homogenous solution was poured into an apparatus with a dimension of 5×10 cm, and was left to allow hexane to evaporate. The resulting composition was dried under reduced pressure at 40° C. for 8 hours to prepare a sheet. This sheet was allowed to stand in an atmosphere of 23° C. and a humidity of 50% for 168 hours to produce a cured product.

The resulting cured product was evaluated in the same manner as in Example 27. The results are shown in Table 12.

Comparative Example 5

A copolymer was produced in the same manner as in Example 17, except that the low tactic polypropylene in Production Example 1 was used instead of the polypropylene in Example 16(1).

A sheet was prepared in the same manner as in Example 27, except that 20 g of this copolymer was used instead of the copolymer of Example 16. The sheet was allowed to stand in an atmosphere of 23° C. and a humidity of 50% for 168 hours to produce a cured product.

The resulting cured product was evaluated in the same manner as in Example 27. The results are shown in Table 12.

Example 30

100 parts of the copolymer of Example 19 and 3 parts of polypropylene glycol (average molecular weight 250) (Uniol D-250, manufactured by NOF Corporation) were homogenously mixed at 140° C., and the mixture was shaped into a 1 mm-thick sheet. Subsequently, the sheet was treated at 140° C. for 8 hours.

The sheet which had been cooled (cured product) was heated for 10 minutes on a hot plate of which the temperature was controlled to 120° C., and a change in morphology was observed. The results are shown in Table 12.

Comparative Example 6

A copolymer was produced in the same manner as in Example 19, except that the low tactic polypropylene of Production Example 1 was used instead of polypropylene of Example 16(1).

A sheet was prepared and evaluated in the same manner as in Example 30, except that 20 g of this copolymer was used instead of the copolymer in Example 19. The results obtained are shown in Table 12.

TABLE 12

| | Appearance | Physical properties |
|---|---|---|
| Example 27 | Shape retained | Rubber-like elastic product |
| Example 28 | Shape retained | Rubber-like elastic product |
| Example 29 | Shape retained | Rubber-like elastic product |
| Example 30 | Shape retained | Rubber-like elastic product |
| Com. Ex. 5 | Shape retained | Highly viscous molten fluidic product |
| Com. Ex. 6 | Molten state | Molten fluidic product |

Production Example 4

Production of Terminally Unsaturated Highly Tactic IPP

Isotactic Polypropylene

In a stainless-made reactor having an internal volume of 1.6 L provided with a stirrer, in the atmosphere of nitrogen, 400 mL of dehydrated toluene and 2 mL of a toluene solution of 2 mmol of methylaluminoxane were incorporated, followed by stirring. To the resultant, 1.5 μmol of ethylene bisindenyl zirconium dichloride was incorporated, and the temperature of the resultant was increased to 40° C. Then, 0.7 MPa of propylene was charged, and the total pressure was fixed, followed by polymerization for 5 hours.

After the completion of the polymerization, the reaction mixture was put to a large amount of methanol. Polypropylene was collected by filtration. After drying with air, drying under reduced pressure was conducted at a temperature of 80° C., whereby 210 g of polypropylene was obtained.

The molecular weight (weight-average molecular weight) (Mw) of the resulting polypropylene was 35000 and the molecular weight distribution (Mw/Mn) was 1.85. The number of terminal vinylidene groups was 0.9/molecule and the tacticity (mmmm) was 78.9 mol %.

Production Example 5

Production of Terminally Unsaturated Atactic PP

Polymerization was conducted in the same manner as in Production Example 4, except that 10 μmol of biscyclopentadienyl zirconium was used instead of ethylenebis indenyl zirconium chloride, the propylene pressure was changed to 0.5 MPa, and polymerization was conducted at 20° C. for 90 minutes.

After the completion of the polymerization, the resultant was incorporated into 1 l of methanol containing 2 mL of 12N hydrochloric acid. The polymer was washed with water after stirring, whereby polypropylene in the liquid form was obtained. The resulting liquid polypropylene was dried at 80° C. under reduced pressure, whereby 104 g of polypropylene was obtained.

The resulting polypropylene had a weight average molecular weight (Mw) of 7340 and a molecular weight distribution (Mw/Mn) of 1.77. The number of terminal vinylidene groups was 0.95/molecule and the tacticity (mmmm) was 9.0 mol %.

Example 31

Production of Highly Terminally Unsaturated Polypropylene

In a stainless-made reactor (internal volume: 500 mL) provided with a stirrer, 40 g of polypropylene produced in Production Example 4 was incorporated. The resultant was stirred for 30 minutes under the stream of nitrogen.

Stirring was stopped, and the resin temperature was increased to 160° C. by means of a mantle heater. After confirming that the resin was molten, the stirring was started again. The mantle heater was controlled such that the resin temperature was fixed at 270° C. To this molten resin, 0.4 ml of cumene hydroperoxide was added dropwise for 4 minutes. After the completion of the dropwise addition, reaction was conducted for 4 minutes, followed by cooling to 110° C. To this, paraxylene was incorporated, and the resultant was heated, whereby a homogenous solution was prepared. Then, the solution was collected and the solvent was removed, followed by drying under reduced pressure at 150° C. for 10 hours, whereby radically decomposed polypropylene was obtained.

The yield of the resulting decomposed polypropylene was 98.87 mass % relative to the charged polypropylene, and the amount of generated bi-products was small. The weight-average molecular weight (Mw) of the radically decomposed polypropylene was 13200 and the molecular weight distribution (Mw/Mn) was 1.62. The number of terminal vinylidene groups was 1.85/molecule.

Example 32

Production of Highly Terminally Unsaturated Polypropylene

In a stainless-made reactor (internal volume: 500 mL) provided with a stirrer, 40 g of atactic polypropylene produced in Production Example 5 was incorporated. The resultant was stirred for 30 minutes under the stream of nitrogen.

Stirring was stopped, and the resin temperature was increased to 160° C. by means of a mantle heater. After confirming that the resin was molten, the stirring was started again. The mantle heater was controlled such that the resin temperature was fixed at 270° C. To this moten resin, 0.4 ml of cumene hydroperoxide was added dropwise for 4 minutes. After the completion of the dropwise addition, reaction was wnducted for 4 minutes, followed by cooling to 110° C.

After the completion of the reaction, n-heptane was incorporated at 40° C., whereby a homogenous solution was prepared. Then, the solution was collected and the solvent was removed, followed by drying under reduced pressure at 100° C. for 10 hours, whereby radically decomposed polypropylene was obtained.

The yield of the resulting decomposed polypropylene was 98.25 mass % relative to the charged polypropylene, and the amount of generated bi-products was small. The weight-average molecular weight (Mw) of the radically decomposed polypropylene was 2900 and the molecular weight distribution (Mw/Mn) was 1.76. The number of terminal vinylidene groups was 1.9/molecule.

Example 33

Production of Hydrosilylated Polypropylene

To 5 g of the radically decomposed polypropylene produced in Example 1 and 0.2 g of diethoxymethylsilane, as the catalyst, 130 ppm of a platinum-divinyltetramethyl disiloxane complex (SIP6831.0, manufactured by Azmax Corporation) was added, followed by reaction at 100° C. for 5 hours.

For the resulting polypropylene, since the unsaturated bond at around 1640 cm$^{-1}$ disappeared in the infrared absorp-

Example 34

Production of Hydrosilylated Polypropylene

The reaction was conducted in the same manner as in Example 33, except that the polypropylene in Example 32 was used instead of the radically decomposed polypropylene in Example 1 and 0.5 g of diethoxymethylsilane was used.

For the resulting polypropylene, since the unsaturated bond at around 1640 cm$^{-1}$ disappeared in the infrared absorption spectrum, it was confirmed that hydrosilylation proceeded. It was confirmed that hydrosilyated polypropylene was produced.

Example 35

Production of a Cured Product 4 g of the hydrosilylated polypropylene in Example 33 was dissolved in 50 mL of hexane in the atmosphere of nitrogen, and it was confirmed that the hydrosilylated polypropylene was dissolved homogeneously. To the resultant, 10 mg of dibutyltin dilaurate was added, and the resultant was stirred until it became homogeneous. The resulting homogenous solution was poured into an apparatus with a dimension of 5×10 cm, and was left to allow hexane to evaporate. The resulting composition was dried under reduced pressure at 40° C. for 8 hours to prepare a sheet. This sheet was allowed to stand in an atmosphere of a temperature of 23° C. and a humidity of 50% for 168 hours to produce a cured product. The resulting cured product was heated for 10 minutes on a hot plate of which the temperature was controlled at 120° C., and a change in morphology was observed. As a result, the product was confirmed to be a cured product which could retain its morphology in the heated state and showed elasticity.

Example 36

Production of a Cured Product 10 g (6.07 mmol) of the radical decomposed polypropylene obtained in Example 32, which is liquid at room temperature, was mixed with 1.2 g of polymethyl H siloxane (HMS-991, manufactured by Azmax Corporation). To the resultant, 10 mg of a platinum-divinyltetramethyldisiloxane complex (SIP6831.0, manufactured by Azmax Corporation) was added and mixed. The resultant was poured into an apparatus having a dimension of 5×10 cm, and stored at room temperature for 10 days to obtain a cured product.

The cured product was heated on a hot plate of which the temperature was controlled at 120° C. for 10 minutes, and a change in morphology was observed. As a result, the product was confirmed to be a cured product which could retain its morphology in the heated state and showed elasticity.

Example 37

(1) Production of a radically decomposed atactic polypropylene/2-ethylhexy acrylate/3-(triethoxysilyl)propyl=methacrylate copolymer A 50 mL-reactor provided with a stirrer was fully replaced with nitrogen. Then, 10 g of the atactic polypropylene produced in Example 32 was incorporated, followed by stirring in the nitrogen stream for 10 minutes. The resultants were molten at a temperature of 140° C. To the resultant, 2.5 ml (2.2 g) of 2-ethylhexyl acrylate, 0.3 mL (0.31 g) of 3-(triethoxysilyl)propyl=methacrylate and 0.1 mL (0.09 g) of an organic peroxide (Perbutyl C, manufactured by NOF Corporation) were mixed and dissolved, and the resulting mixture was added with stirring over a period of 10 minutes. After the completion of the addition, the reaction was conducted for further 10 minutes. The resultant was kept for 20 minutes under a reduced pressure while keeping the temperature at 140° C. The resulting copolymer was stored under nitrogen atmosphere. The molecular weight distribution of the resulting graft copolymer was 2.3.

(2) Production of a Cured Product

The copolymer obtained in (1) was heated to 100° C. To the heated copolymer, 10 mg of dibutyltin dilaurate was added, and stirring was conducted until it become homogeneous. The resultant was poured into an apparatus having a dimension of 5×10 cm. The resultant was allowed to stand in an atmosphere of a temperature of 23° C. and a humidity of 50% for 168 hours to produce a cures product.

The cured product obtained was heated on a hot plate of which the temperature was controlled at 120° C. for 10 minutes, and a change in morphology was observed. As a result, the product was confirmed to be a cured product which could retain its morphology in the heated state and showed elasticity.

Production Example 6

Production of Low Crystalline Polypropylene

In a stainless-made pressure-resistant autoclave having an internal volume of 1.4 L, under the atmosphere of nitrogen, 400 mL of n-heptane, 1 mmol of triisobutyl ammonium and 2 mmol of methylaluminoxane (toluene solution, manufactured by Albemarle Corporation) was added, and stirred for 5 minutes.

Stirring was stopped, and 1 mL of n-heptane containing 1 μmol of (1,2'-dimethylsilyene)(2,1'-dimethylsilylene)-bis(3-trimethylsilylmethylindenyl) zirconium dichloride was added. Hydrogen was introduced at a gauge pressure of 0.1 MPa, and the temperature was controlled to 60° C. Further, propylene was continued to introduce such that the gauge pressure became 0.6 MPa, and polymerization was conducted for 40 minutes.

The resulting polypropylene was 156 g, and it had a weight average molecular weight of 93,000, a number average molecular weight of 48,300 and a number of terminal vinylidene groups of 0.051/molecule. The staticity [mmmm] was 46 mol %.

Example 38

Production of Highly Terminally Unsaturated Polypropylene

In a stainless-made reactor (internal volume: 500 mL) provided with a stirrer, 40 g of polypropylene produced in Production Example 6 was incorporated. The resultant was stirred for 30 minutes in the stream of nitrogen. Stirring was stopped and the resin temperature was increased to 120° C. by means of a mantle heater. After confirming that the resin was molten, the stirring was started again. The mantle heater was controlled such that the resin temperature was fixed at 270° C. To this molten resin, 0.8 ml of cumene hydroperoxide (product name; Percumyl H, manufactures by NOF Corporation) was added dropwise for 20 minutes. After the completion of the dropwise addition, reaction was conducted for 4 minutes, followed by cooling to 110° C. While keeping this temperature, 200 mL of toluene was put to prepare a homogeneous solution.

This toluene solution was collected in a Teflon (registered trademark) coated vat, and toluene was removed. The resultant under reduces pressure was dried at 100° C. for 8 hours, whereby radically decomposed polypropylene was obtained.

The resulting radically decomposed polypropylene had a weight average molecular weight (Mw) of 15800, a molecular weight distribution (Mw/Mn) of 1.45 and a number of terminal vinylidene groups (fv) per molecule of 1.60. The generation ratio of a bi-product (the amount of generated bi-product [g]/the amount of raw materials [g]) was 0.015.

Example 39

Production of Highly Terminally Unsaturated Polypropylene

Continuous Production of Radical Decomposed Polypropylene by Using Melt Extruder (1) Production of a Composition Composed of Polypropylene and Organic Peroxide 2,700 g of poly propylene obtained in Production Example 2 was incorporated in a universal mixing stirrer (model: 5DM-L-03-rr, Dalton mixer), and stirred at 126 rpm under the stream of nitrogen for 30 minutes. The nitrogen stream was stopped. While keeping the nitrogen atmosphere state, a homogenous solution of 20 mL of hexane and 24 g of diisopropylbenzene hydroperoxide (product name: Percumyl P, manufactured by NOF Corporation) was added dropwise for 20 minutes with stirring. After the dropwise addition, stirring was conducted for 20 minutes.

After the completion of the stirring, pellets were visually observed. The pellets were in the dry state. It was confirmed that the organic peroxide was uniformly absorbed.
(2) Radical Decomposition by Melt Extrusion By using a twinlab blast mill manufactured by Toyo Seiki Kogyo Co., Ltd (20 mmφ, L/D=27), extrusion was conducted under the following conditions (barrel temperature: 280° C., dice temperature: 200° C., number of revolutions: 120 rpm and discharge amount: 2,100 g/h). The discharged product was air-cooled to produce solid-like decomposed polypropylene. Contamination and adhesion of the hopper part and the constant feeder were visually confirmed. Contamination and adhesion of the hopper part, the lower hopper part the screw were not found. The weight-average molecular weight of the decomposed polypropylene was 48,700, the Mp/Mm was 0.378 and the number of terminal unsaturated groups (the number of terminal vinylidene groups) was 1.62/molecule.
(3) Production of a radically decomposed low tactic polypropylene/2-ethylhexyl acrylate/3-(triethoxysilyl) propyl=methacrylate copolymer A 3 L-reactor provided with a stirrer was fully replaced with nitrogen. Then, 500 g of the decomposed polypropylene produced in (2) above was incorporated. Under the stream of nitrogen, melting was confirmed at a temperature of 160° C. Then, the resultant was stirred for 30 minutes. While the internal temperature was controlled at 160° C., 1.5 mL of a mixed solution of 63.1 g of 2-ethylhexy acrylate, 32.2 g of 3-(triethoxysilyl)propyl=methacrylate and tertiary butyl cumyl peroxide (Perbutyl C, manufactured by NOF Corporation) was added with stirring for 35 minutes. After the completion of addition, the reaction was further conducted for 15 minutes. The resulting graft copolymer was collected in the atmosphere of nitrogen, and stored in the nitrogen atmosphere.
(4) Evaluation
(i) Measurement of B Viscosity According to JISK-6862, the viscosty of the above-mentioned copolymer which had been molten at 190° C. was measured by means of a Blookfield viscometer. As the viscometer, a TVB-10 type viscometer (manufactured by Toki Sangyo Co., Ltd) and a M2 roter (No. 21) were used, and measurement was conducted by means of a H-2 type small sample adapter.

As a result, it was found that the B viscosity was 5,840 mPas.
(ii) Measurement of Heat-Resistant Creep Temperature 35 g of the graft copolymer produced in (3) above was molten by heating at 180° C. To the resultant, 0.07 g of dibutyltin dilaurate (IV) was added as a curing catalyst, followed by sufficient stirring. 0.5 g of this molten resin was uniformly applied in an area of 80 mm, from the end of a cotton dack having a width of 25 mm and a length of 200 mm (JIS 10) by means of a stainless-made spatula. The resulting cotton duck was laminated on a polypropylene plate having a width of 25 mm, a length of 100 mm and a thickness of 2 mm. Subsequently, a 2 kg-weigh weight was put on the adhesion part, and thermal adhesion was conducted in a 120° C. oven for 10 minutes. The polypropylene plate was taken out as it was and cooled to room temperature. The laminated test piece was moisture-cured in an atmosphere of 23° C. and a relative humidity of 50% for 7 days.

The measurement of the heat resistant creep temperature was conducted according to JIS K6833. Specifically, the low part of a specimen was cut such that the length of the bonding part became 25 mm. A 500 g-weigh weight was attached to the lower end of a specimen hanging down in the thermostat chamber. The temperature of the thermostat chamber was kept at 38° C. for 15 minutes. The temperature was increased by 2° C. for every 5 minutes, and the temperature at which the weight was dropped was taken as the heat resistant creep temperature. As a result, the heat resistant creep temperature was 81° C.

Example 40

A copolymer was produced in the same manner as in Example 39, except that the amount of 3-(triethoxysilyl) propyl=methacrylate was changed to 21.4 g in Example 39 (3). As a result, the B viscosity was 6,900 mPaS, and the heat resistant creep temperature was 71° C.

Example 41

A copolymer was produced in the same manner as in Example 40, except that 6.0 g of 2-ethylhexyl mercaptoacetate as a chain transfer agent was added to a homogenous solution of 2-ethylhexl acrylate, 3-(triethyoxysilyl) propyl=methacrylate and tertiary butyl cumyl peroxide and the mixed solution was added dropwise. As a result, the B viscosity was 4,600 mPaS and the heat resistant creep temperature was 69° C.

As compared with Example 40, due to the use of a chain transfer agent, the melt viscosity could be significantly lowered without impairing the heat resistant creep properties.

Example 42

Production of a Copolymer with a Polar Monomer

A glass-made separable flask having a volume of 3 L provided with a stirrer and an inlet port was fully dried and put in the nitrogen atmosphere. To the resultant, 500.0 g of decomposed polypropylene produced in Example 39(2) and 5.65 g of maleic anhydride were incorporated. 492 g of dehydrated ethyl acetate was incorporated and stirring was started at room temperature. 484 g of heptane was added thereto. The resultant was heated by using oil bath such that it was boiled (internal temperature: 80.6° C.). To the resultant, a homogeneous solution comprising 54.2 g of acrylic acid, 10.0 g of azobisbutyronitrile and 88.5 g of dehydrated ethyl acetate was incorporated at a fixed speed for 115 minutes. After the completion of the incorporation, a reaction was continued for further 180 minutes. After the addition, part of the reaction mixture was taken out. A large amount of ethyl acetate was added to allow it to separate into a liquid part and a solid part, and a monomer remained un-reacted in the liquid part was subjected to quantitative analysis by gas chromatography. The liquid of the graft copolymer was collected by reducing the pressure by heating, and the pressure was reduced at 130° C. for 8 hours. As a result, the amount of a monomer remained un-reacted was 0.18 mass % relative to the amount of the generated graft copolymer.

The color of the graft copolymer obtained after reducing the pressure by heating and drying was white.

The infrared absorption spectrum of the graft copolymer was measured. As a result, absorption derived from the vinylidene group at 888 cm$^{-1}$ was not observed, confirming that the graft polymerization proceeded efficiently.

The B viscosity of the graft copolymer was 12,500 mPaS.

Comparative Example 7

Graft copolymerization was conducted in the same manner as in Example 42, except that acrylic acid and maleic anhydride were placed in a reaction chamber in advance, and a dehydrated ethyl acetate solution of azobisisobutylonitrile was incorporated.

As a result, the amount of a monomer remained un-reacted was 1.02 mass % relative to the amount of the generated graft copolymer.

The graft copolymer obtained after reducing the pressure by heating and drying was turned yellow.

The infrared absorption spectrum of the graft copolymer was measured. As a result, absorption derived from the vinylidene group was observed, confirming that the graft polymerization did not proceed efficiently.

Example 43

Graft to polymerization was conducted in the same manner as in Example 42, except that, a solution obtained by adding 6 g of n-dodecylmercaptane was added dropwise to a homogenous solution of acrylic acid, azobisisobutylnitrile and dehydrated ethyl acetate. After the completion of the reaction, part thereof was taken out, and incorporated into a large amount of tetrahydrofuran to allow it to be dissolved. The solution was filtered by a 400-mesh stainless-made sieve. As a result, nothing remained on the mesh was observed.

The B viscosity of the collected graft copolymer was 4500 mPaS.

Example 44

(1) Production of Low Tactic Polybutene

A stainless-made pressure-resistant autoclave having an internal volume of 1.4 L provided with a stirrer was fully dried by reducing the pressure thereof by heating to 80° C. to allow it to be in the nitrogen atmosphere. To this autoclave, 1 mL of a heptane solution containing 400 mL of dehydrated heptane and 0.5 mmol of trisobutyl aluminum was incorporated, followed by stirring at room temperature for 5 minutes. Thereafter, 2.5 mL of heptane slurry containing 3.2 µmol of dimethylanilinium tetrakis(pentafluorophenyl)borate and 3.0 mL of a heptane solution containing (1,2'-dimethylsilylene) (2,1'-dimethylsilylene)-bis(3-trimethylsilylmethylindenyl) zirconium dichloride were incorporated. Then, 25 mL of hydrogen was introduced, and stirring was started. Thereafter, in a pressure-resistant apparatus, 200 mL of 1-butene was incorporated through a balance line, and polymerization was conducted for 90 minutes while controlling the temperature to 90° C. After the completion of the polymerization, cooling and depressurization were conducted to collect the reaction mixture. The reaction mixture was then dried, whereby 89 g of poly(1-butene) was produced.

The weight-average molecular weight (Mw) of the poly(1-butene) was 9,800, the molecular weight distribution (Mw/Mn) was 2.2, and the number of the terminal vinylidene group per molecule was 0.7/molecule. The tacticity (mmmm) was 61.6 mol %.

(2) Radical Decomposition of Terminal Unsaturated Polybutene

In a stainless-made reactor (internal volume: 500 mL) provided with a stirrer, 80 g of polybutene produced in (1) above was incorporated. Stirring was conducted for 30 minutes in the stream of nitrogen.

Stirring was stopped and the resin temperature was elevated to 120° C. by means of a mantle heater. After confirming that the resin was molten, stirring was re-started. Then, the mantle heater was controlled such that the resin temperature was fixed at 270° C. To this molten resin, 1.6 mL (1.42 g) of cumene hydroperoxide (product name: Percumyl H, manufactured by NOF Corporation) was added dropwise for 60 minutes. After the completion of the dropwise addition, reaction was conducted for 4 minutes. Then, the resulting was cooled in the air to 110° C. While keeping the temperature at 110° C., 200 mL of toluene was incorporated to prepare a homogenous solution.

This toluene solution was collected in a vat coated with Teflon (registered trademark), and toluene was removed, followed by drying under reduced pressure at 100° C. for 8 hours, whereby radically decomposed polybutene was obtained.

For the resulting radically decomposed polybutene, the weight-average molecular weight Mw was 2,200, the number-average molecular weight Mn was 1,300, the molecular weight distribution Mw/Mn was 1.7, the Mp/Mm was 0.244 and the number per molecule of the terminal vinylidene groups (the number of the terminal vinylidene groups) was 1.71 per molecule.

INDUSTRIAL APPLICABILITY

By using a terminal vinylidene group at the reaction point, the terminal unsaturated polyolefin of the invention can be used in various applications, such as imparting a chemically inactive polyolefin material with adhesiveness, applicability and coating properties, production of an alloy material with other resins than polyolefin and a composition of inorganic and organic fillers. Further, by using as a reactive raw material, it can be used widely as a reactive hot melt adhesive, a sealing material, a potting material or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in its entirety.

The invention claimed is:

1. A terminally unsaturated polyolefin, which is selected from the group consisting of:
   a propylene homopolymer;
   a propylene-based copolymer consisting of propylene, ethylene and one or more α-olefins each having 4 to 10 carbon atoms, such that the propylene-based copolymer comprises 10 mol % or less of said ethylene and the one or more α-olefins each having 4 to 10 carbon atoms;
   a butene-1 homopolymer; and
   a butene-1-based copolymer consisting of butene-1, ethylene, propylene and one or more α-olefins each having 5 to 10 carbon atoms, such that the butene-1-based copolymer comprises 10 mol % or less of said ethylene, said propylene and the α-olefins each having 5 to 10 carbon atoms
   wherein the terminally unsaturated polyolefin satisfies the following (1) to (4):
   (1) a mesopentad fraction [mmmm] of propylene chain unit or butene-1 chain unit is 20 to 80 mol %;
   (2) a number of terminal vinylidene groups per molecule is 1.3 to 2.5;
   (3) a weight-average molecular weight Mw is 500 to 100,000; and
   (4) a molecular weight distribution Mw/Mn is 1.1 to 2.6.

2. The polyolefin according to claim 1, which is a propylene homopolymer.

3. A method for producing the terminally unsaturated polyolefin according to claim 1, the method comprising decomposing a raw material polyolefin in the presence of an inert gas,
   wherein:
   the raw material polyolefin is selected from the group consisting of:
      a propylene homopolymer;
      a propylene-based copolymer consisting of ethylene and one or more α-olefins each having 4 to 10 carbon atoms, such that the propylene-based copolymer comprises 10 mol % or less of said ethylene and the α-olefins each having 4 to 10 carbon atoms;
      a butene-1 homopolymer; and
      a butene-1-based copolymer consisting of butene-1, ethylene, propylene and one or more α-olefins each having 5 to 10 carbon atoms, such that the butene-1-based copolymer comprises 10 mol % or less of said ethylene, said propylene and the α-olefins each having 5 to 10 carbon atoms; and
   the raw material polyolefin satisfies the following (5) and (6);
   (5) a tacticity [mmmm] of propylene chain unit or butene-1 chain unit is 20 to 80 mol %; and
   (6) a weight average molecular weight Mw is 4000 to 1,000,000.

4. The method according to claim 3, wherein the decomposition is a heat decomposition reaction in which the raw material polyolefin is heat treated at a temperature of 300 to 400° C. for 30 minutes to 10 hours.

5. The method according to claim 3, wherein the decomposition is a radical decomposition reaction in which an organic peroxide is added in an amount of 0.05 to 2 mass % relative to the raw material polyolefin at 160 to 300° C.

6. The method according to claim 5, wherein a one minute half life temperature of the organic peroxide is 140 to 270° C.

7. A terminally unsaturated polyolefin obtained by decomposing a raw material polyolefin selected from the group consisting of:
   a propylene homopolymer;
   a propylene-based copolymer consisting of propylene, ethylene and one or more α-olefins each having 4 to 10 carbon atoms, such that the propylene-based copolymer comprises 10 mol % or less of said ethylene and the α-olefins each having 4 to 10 carbon atoms;
   a butene-1 homopolymer; and
   a butene-1-based copolymer consisting of butene-1, ethylene, propylene and one or more α-olefins each having 5 to 10 carbon atoms, such that the butene-1-based copolymer comprises 10 mol % or less of said ethylene, said propylene and the α-olefins each having 5 to 10 carbon atoms,
   wherein the terminally unsaturated polyolefin satisfies the following (7) to (10):
   (7) a number of terminal vinylidene groups per molecule (fv) is 1.3 to 2.5;
   (8) fv≥−2 (Mp/Mm)+2 wherein Mp is the number average molecular weight of the terminally unsaturated polyolefin, Mm is the number average molecular weight of the raw material polyolefin, and Mp/Mm is 0.05 to 0.8;
   (9) a weight average molecular weight Mw is 500 to 100,000; and
   (10) a molecular weight distribution Mw/Mn is 1.1 to 2.6.

8. The terminally unsaturated polyolefin according to claim 7, which is a terminally unsaturated polyolefin obtained by decomposing a propylene homopolymer or a propylene-based copolymer, wherein a propylene chain unit of the propylene homopolymer or the propylene-based copolymer comprises an atactic structure, a syndiotactic structure or an isotactic structure.

9. The terminally unsaturated polyolefin according to claim 7, wherein the raw material polyolefin is a propylene homopolymer.

10. A method for producing the terminally unsaturated polyolefin according to claim 7, the method comprising decomposing a raw material polyolefin in the presence of an inert gas,
   wherein:
   the raw material polyolefin is selected from the group consisting of:
      a propylene homopolymer;
      a propylene-based copolymer consisting of propylene, ethylene and one or more α-olefins each having 4 to 10 carbon atoms, such that the propylene-based copolymer comprises 10 mol % or less of said ethylene and the α-olefins each having 4 to 10 carbon atoms;
      a butene-1 homopolymer; and
      a butene-1-based copolymer consisting of butene-1, ethylene, propylene and one or more α-olefins each having 5 to 10 carbon atoms, such that the butene-1-based copolymer comprises 10 mol % or less of said ethylene, said propylene and the α-olefins each having 5 to 10 carbon atoms; and the raw material polyolefin has a weight-average molecular weight of 4000 to 1,000,000.

11. A functional polyolefin, comprising the terminally unsaturated polyolefin according to claim 1, wherein 5 mol % or more of the terminal vinylidene groups of the terminally unsaturated polyolefin comprise a functional group.

12. The functional polyolefin according to claim 11, wherein the functional group is one or more selected from the group consisting of a hydroxyl group, an epoxy group, an isocyanate group, an alkoxysilicon group, an alkylsilicon group, a carboxyl group, an amino group and an acid anhydride structure.

13. A cross-linked body obtained by wet curing the functional polyolefin according to claim 11 comprising at least an alkoxysilicon group as the functional group.

14. A reaction product obtained by reacting the terminally unsaturated polyolefin according to claim 1 with an organohydrogen polysiloxane having two or more SiH groups per molecule.

15. A method for producing a graft copolymer or a thermoplastic resin composition comprising the graft copolymer, the method comprising graft polymerizing, in the presence of 0.001 to 10 parts by mass of a radical polymerization initiator at 40 to 230° C.:

100 parts by mass of a combination of 20 to 100 mass % of the terminally unsaturated polyolefin according to claim 1 and 0 to 80 mass % of another polyolefin other than the terminally unsaturated polyolefin; and 0.2 to 300 parts by mass of one or more monomers selected from the group consisting of the following [I] to [IV]:
[I] acrylic acid and acrylic acid's derivatives comprising an acrylic group;
[II] methacrylic acid and methacrylic acid's derivatives comprising a methacrylic group;
[III] vinylesters and vinylesters' derivatives comprising a vinyl group and an ester structure, or vinylalkoxysilane; and
[IV] styrene and styrene's derivatives comprising a styryl group, or 0.2 to 300 parts by mass of a mixture of one or more monomers selected from the group consisting of the following Group A:
[V] maleic anhydride and substituted maleic anhydride;
[VI] maleic acid and its esters;
[VII] maleimide and substituted maleimide, and one or more monomers selected from the group consisting of the following Group B:
[I] acrylic acid and acrylic acid's derivatives comprising an acrylic group;
[II] methacrylic acid and methacrylic acid's derivatives comprising a methacrylic group;
[III] vinylesters and vinylesters' derivatives comprising a vinyl group and an ester structure, or vinylalkoxysilane;
[IV] styrene and styrene's derivatives comprising a styryl group; and
[VIII] α-olefin.

16. The method according to claim 15, wherein the graft polymerization occurs in the presence of a chain transfer agent.

17. A method for producing a graft copolymer or a thermoplastic resin comprising the graft copolymer, the method comprising contacting a mixture, comprising the terminally unsaturated polyolefin according to claim 1 and a monomer (a) which is substantially not radically homopolymerizable, with a monomer (b) which is copolymerizable with the monomer (a).

18. A product comprising the functional polyolefin according to claim 11, said product selected from the group consisting of an adhesive, a compatibilizer, a dispersant, and a coating agent.

19. A product comprising the functional polyolefin according to claim 11, said product selected from the group consisting of a reactive hot melt adhesive, a sealing agent, and a potting agent.

20. A functional polyolefin, comprising the terminally unsaturated polyolefin according to claim 7, wherein 5 mol % or more of the terminal vinylidene groups of the terminally unsaturated polyolefin comprise a functional group.

21. The functional polyolefin according to claim 20, wherein the functional group is one or more selected from the group consisting of a hydroxyl group, an epoxy group, an isocyanate group, an alkoxysilicon group, an alkylsilicon group, a carboxyl group, an amino group and an acid anhydride structure.

22. A cross-linked body obtained by wet curing the functional polyolefin according to claim 20 comprising at least an alkoxysilicon group as the functional group.

23. A reaction product obtained by reacting the terminally unsaturated polyolefin according to claim 7 with an organohydrogen polysiloxane having two or more SiH groups per molecule.

24. A method for producing a graft copolymer or a thermoplastic resin composition comprising the graft copolymer, the method comprising graft polymerizing, in the presence of 0.001 to 10 parts by mass of a radical polymerization initiator at 40 to 230° C.:

100 parts by mass of a combination of 20 to 100 mass % of the terminally unsaturated polyolefin according to claim 7 and 0 to 80 mass % of another polyolefin other than the terminally unsaturated polyolefin; and 0.2 to 300 parts by mass of one or more monomers selected from the group consisting of the following [I] to [IV]:
[I] acrylic acid and acrylic acid's derivatives comprising an acrylic group;
[II] methacrylic acid and methacrylic acid's derivatives comprising a methacrylic group;
[III] vinylesters and vinylesters' derivatives comprising a vinyl group and an ester structure, or vinylalkoxysilane; and
[IV] styrene and styrene's derivatives comprising a styryl group, or 0.2 to 300 parts by mass of a mixture of one or more monomers selected from the group consisting of the following Group A:
[V] maleic anhydride and substituted maleic anhydride;
[VI] maleic acid and its esters;
[VII] maleimide and substituted maleimide, and one or more monomers selected from the group consisting of the following Group B:
[I] acrylic acid and methacrylic acid's derivatives comprising a methacrylic group;
[II] methacrylic acid and methacrylic acid's derivatives comprising a methacrylic group;
[III] vinylesters and vinylesters' derivatives comprising a vinyl group and an ester structure, or vinylalkoxysilane;
[IV] styrene and styrene's derivatives comprising a styryl group; and
[VIII] α-olefin.

25. The method according to claim 24 wherein the graft polymerization occurs in the presence of a chain transfer agent.

26. A method for producing a graft copolymer or a thermoplastic resin comprising the graft copolymer, the method comprising contacting a mixture, comprising the terminally unsaturated polyolefin according to claim 7 and a monomer (a) which is substantially not radically homopolymerizable, with a monomer (b) which is copolymerizable with the monomer (a).

* * * * *